United States Patent
Chung

(10) Patent No.: US 9,993,996 B2
(45) Date of Patent: Jun. 12, 2018

(54) THIXOTROPIC LIQUID-METAL-BASED FLUID AND ITS USE IN MAKING METAL-BASED STRUCTURES WITH OR WITHOUT A MOLD

(71) Applicant: Deborah Duen Ling Chung, East Amherst, NY (US)

(72) Inventor: Deborah Duen Ling Chung, East Amherst, NY (US)

(73) Assignee: Deborah Duen Ling Chung, East Amherst, NY (US)

( * ) Notice: Subject to any disclaimer, the term of this patent is extended or adjusted under 35 U.S.C. 154(b) by 336 days.

(21) Appl. No.: 14/742,694

(22) Filed: Jun. 17, 2015

(65) Prior Publication Data

US 2016/0368244 A1    Dec. 22, 2016

(51) Int. Cl.
*C22C 29/00* (2006.01)
*C22C 21/00* (2006.01)
(Continued)

(52) U.S. Cl.
CPC .......... *B32B 15/043* (2013.01); *B22F 3/1035* (2013.01); *B22F 3/1055* (2013.01); *B32B 15/01* (2013.01); *C22C 29/005* (2013.01); *B32B 2264/107* (2013.01); *B32B 2605/00* (2013.01); *B33Y 10/00* (2014.12); *B33Y 70/00* (2014.12);
(Continued)

(58) Field of Classification Search
CPC ..... C22C 21/00; C22C 32/00; C22C 32/0063; C22C 32/0068; B22F 3/1035; B33Y 80/00
See application file for complete search history.

(56) References Cited

U.S. PATENT DOCUMENTS 3,936,298 A * 2/1976 Mehrabian ............... C22C 1/005
148/400
4,229,210 A    10/1980 Winter
(Continued)

FOREIGN PATENT DOCUMENTS

| CN | 104388725 A | * | 3/2015 | ............... C22C 1/05 |
| CN | 105385966 A | * | 3/2016 | ............... C22C 45/08 |
| CN | 105583401 A | * | 5/2016 | ............... B22F 3/105 |

OTHER PUBLICATIONS

CN 104388725 A (Mar. 4, 2015) Jiang, Dawei et al. Machine Translation.*

*Primary Examiner* — Rip A Lee

(57) ABSTRACT

This invention provides liquid-metal-based thixotropic fluids that, upon solidification with or without a mold, provide metal-matrix composite materials. The fluid is a liquid metal with dispersed solid particles, which can move substantially relative to one another. The liquid is essentially continuous; the solid is substantially discontinuous. The liquid substantially occupies the separation among the solid particles and essentially occupies a portion of the separation. The portion consists of a plurality of regions. Each region is in contact with the surface of a particle. This invention also provides a laminate consisting of metal-matrix composite layers that are essentially parallel and bonded to one another. This invention further provides a method of making a metal-based structure in the absence of a mold, with relevance to three-dimensional metal printing. This method comprises preparing, shaping and depositing the thixotropic fluid on a substrate, and allowing the fluid to cool for complete solidification.

12 Claims, 8 Drawing Sheets

(51) Int. Cl.

| | | |
|---|---|---|
| *B32B 15/04* | (2006.01) | |
| *B22F 3/10* | (2006.01) | |
| *B22F 3/105* | (2006.01) | |
| *B32B 15/01* | (2006.01) | |
| *B33Y 80/00* | (2015.01) | |
| *B33Y 10/00* | (2015.01) | |
| *B33Y 70/00* | (2015.01) | |
| *C22C 29/06* | (2006.01) | |
| *C22C 29/12* | (2006.01) | |
| *C22C 29/14* | (2006.01) | |
| *C22C 29/16* | (2006.01) | |

(52) U.S. Cl.
CPC ............... *B33Y 80/00* (2014.12); *C22C 29/06* (2013.01); *C22C 29/065* (2013.01); *C22C 29/12* (2013.01); *C22C 29/14* (2013.01); *C22C 29/16* (2013.01); *Y02P 10/295* (2015.11)

(56) References Cited

U.S. PATENT DOCUMENTS

| | | | |
|---|---|---|---|
| 4,622,270 A | 11/1986 | Yamamura | |
| 4,623,388 A * | 11/1986 | Jatkar | C22C 1/1084 420/528 |
| 4,786,467 A | 11/1988 | Skibo | |
| 4,804,034 A | 2/1989 | Leatham | |
| 5,004,035 A * | 4/1991 | Burke | B22F 3/24 164/101 |
| 5,037,489 A | 8/1991 | Kirkwood | |
| 5,186,236 A | 2/1993 | Jean-Pierre | |
| 5,221,324 A * | 6/1993 | Jin | B22D 25/005 428/593 |
| 5,223,347 A * | 6/1993 | Lhymn | C22C 1/00 428/614 |
| 5,303,763 A * | 4/1994 | Aghajanian | C04B 41/009 164/101 |
| 5,372,775 A * | 12/1994 | Hayashi | C22C 1/1042 419/10 |
| 5,390,722 A * | 2/1995 | Ashok | B22D 23/003 164/46 |
| 5,630,466 A | 5/1997 | Garat | |
| 5,836,372 A | 11/1998 | Kono | |
| 5,858,460 A | 1/1999 | Ferrando | |
| 6,135,195 A * | 10/2000 | Lee | C22C 1/005 148/437 |
| 6,432,160 B1 | 8/2002 | Norville | |
| 6,502,623 B1 * | 1/2003 | Schmitt | C04B 41/009 164/39 |
| 6,564,856 B1 | 5/2003 | Buckley | |
| 6,630,247 B1 | 10/2003 | Fox | |
| 6,745,818 B1 | 6/2004 | Fan | |
| 6,860,314 B1 * | 3/2005 | Koide | B22D 17/007 164/113 |
| 7,169,350 B2 * | 1/2007 | Norville | B22D 17/007 164/468 |
| 2001/0027833 A1 * | 10/2001 | Uggowitzer | C22C 1/005 148/549 |
| 2003/0205351 A1 | 11/2003 | Buckley | |
| 2004/0137218 A1 | 7/2004 | Liu | |
| 2004/0261970 A1 | 12/2004 | Withers | |
| 2005/0034837 A1 | 2/2005 | Tetsuichi | |
| 2005/0085030 A1 * | 4/2005 | Morelli | C23C 24/04 438/202 |
| 2006/0038328 A1 | 2/2006 | Jian | |
| 2008/0127777 A1 | 6/2008 | Tetsuichi | |
| 2010/0326739 A1 | 12/2010 | Choe | |
| 2014/0335368 A1 | 11/2014 | Faruque | |
| 2014/0345521 A1 | 11/2014 | Silverbrook | |
| 2015/0005920 A1 | 1/2015 | Matsumoto | |
| 2015/0069649 A1 | 3/2015 | Bai | |
| 2015/0080495 A1 | 3/2015 | Heikkila | |
| 2015/0115494 A1 | 4/2015 | Deych | |
| 2015/0125334 A1 | 5/2015 | Uetani | |
| 2016/0298215 A1 * | 10/2016 | Yang | C22C 28/00 |

* cited by examiner

THIXOTROPIC LIQUID-METAL-BASED FLUID AND ITS USE IN MAKING METAL-BASED STRUCTURES WITH OR WITHOUT A MOLD

FIELD OF THE INVENTION

This invention relates to the field of thixotropic fluids. It also relates to the field of metal-matrix composites. In addition, it relates to metal-based structures and their fabrication. Furthermore, it relates to three-dimensional printing of metal-based objects.

BACKGROUND OF THE INVENTION

A fluid refers to a substance that is capable of flowing. A thixotropic fluid is a fluid that flows under mechanical stress application and does not flow in the absence of a mechanical stress. As a consequence, a thixotropic fluid that has been shaped through flow in the presence of a mechanical stress essentially maintains its shape and dimensions after removal of the mechanical stress. This means that the shape and dimensions are essentially maintained in the absence of a container (i.e., a mold) for the fluid. The thixotropic character allows the making of objects of specified shapes and dimensions without using molds. An example of a thixotropic fluid is toothpaste.

Molds are containers that have the shape and size of the object to be fabricated. Fabrication of objects without using molds simplifies the fabrication process and reduces the cost of fabrication. Molds tend to be expensive and demolding (conducted after the completion of the molding) is an additional non-trivial step. The difficulty of demolding stems from the tendency for the molded material to adhere to the mold.

Three-dimensional (3D) printing refers to printing layer-by-layer in the absence of a mold to form a 3D structure (Silverbrook, US20140345521; Matsumoto, US20150005920; Heikkila and Heikkila, US20150080495). An example of a 3D structure is a gear. The 3D object resulting from the 3D printing in the context of this Specification is to be distinguished from a print product that is functionally two-dimensional (2D), though it appears 3D, as obtained, for example, by printing multiple layers of ink on a piece of paper. Such 2D products (though having a 3D appearance) cannot be detached from the substrate (such as a piece of paper) to form a standalone object. In contrast, this invention concerns 3D products that can be detached from the substrate to form a standalone object.

Because metals are involved in numerous parts (such as auto parts) and structures (such as car bodies), 3D printing of metals is technologically important. However, the printing of metals is technically much more challenging than the printing of polymers or cement, due to the high temperatures involved in metal processing and the tendency for metals to oxidize at elevated temperatures in the presence of air.

Metal parts of complex shapes are commonly needed in the automobile, aerospace, marine, machinery, electronic and medical industries. Machining, casting and deformation processing are conventionally used to fabricate these parts. However, machining produces much waste material and all these methods are inadequate for fabricating some of the complex shapes required. In contrast to machining, 3D printing essentially does not produce waste. This is because 3D printing is an additive process, whereas machining is a subtractive process. Furthermore, 3D printing can produce intricate shapes that these conventional methods cannot produce. The use of 3D metal printing to produce parts (e.g., pipes, fittings, fasteners, etc.) on demand greatly reduces the need to stock spare parts, thus saving storage and facility costs.

The current methods of 3D metal printing mainly include the following methods: (i) laser sintering (more correctly called laser welding) that involves the melting of metal powder by using a laser beam and subsequent solidification of the molten metal upon cooling, (ii) electron beam sintering (more correctly called electron beam welding) that involves the melting of metal powder by using an electron beam and subsequent solidification of the molten metal upon cooling, (iii) gas metal arc welding, which involves the melting of the metal from a wire by using an electric arc and subsequent solidification upon cooling, (iv) liquid metal drop/jet deposition (akin to thermal spraying) and subsequent solidification of the deposited drops, and (v) powder metallurgy (abbreviated PM) (Uetani and Stuber, US20150125334; Deych and Abenaim, US20150115494; Bai et al., US20150069649), e.g., printing a metal particle paste that contains a binder (or successive layers of a binderless metal powder and an organic binder), followed by heating to burn off the binder and subsequent sintering of the metal powder by heating below the melting temperature. The sintering typically takes a long time (e.g., 20 hours). An example of an organic binder is sugar. The binder can be dissolved in a solvent (such as water, alcohol, etc.) and applied as a liquid solution during 3D printing. Alternately, the binder can be in the form of small solid particles that are suspended in a liquid and applied as a suspension. Still alternately, the binder can be dry small solid particles and applied as a powder.

The use of metal powder in the laser sintering, electron beam sintering and PM methods has the disadvantage that the metal powder particles tend to be covered with the native oxide of the metal. For example, aluminum particles are covered by aluminum oxide, which is in the form of an adherent and non-porous coating. (Aluminum foil as commonly used in the kitchen is similarly covered by a protective layer of the native oxide of aluminum.) The removal of the oxide coating on aluminum requires a highly reducing environment. In general, the oxide on the metal particle surface hinders the welding (joining) of the particles. This is because the oxide (e.g., $Al_2O_3$) has a much higher melting temperature than the corresponding metal (e.g., Al) and, as a consequence, the oxide does not melt when the metal melts. Furthermore, per unit mass of material, metal powder is expensive compared to metal ingots. Moreover, metal powder that is small in particle size is typically more expensive than the corresponding metal powder with a larger particle size. A sufficiently small particle size is required for the laser sintering, electron beam sintering and PM methods, in order to achieve adequate spatial resolution in the resulting 3D structure and to make the melting or sintering of the particles complete. In addition, due to the large surface area of metal powder compared to a metal ingot with the same mass, metal oxidation (which occurs at the surface) is much more severe for metal powder than metal ingots. The severe oxidation can cause combustion, which is dangerous.

The metal wire used in the metal arc method is expensive compared to a metal ingot with the same mass. The surface area of a metal wire is greater than that of a metal ingot with the same mass. The surface area per unit mass of a metal wire is particularly large when the wire diameter is small. A sufficiently small wire diameter is needed for achieving adequate spatial resolution in the resulting 3D structure and for melting to occur throughout the cross section of the wire. As a result, oxidation (which occurs at the surface) tends to be more severe for a metal wire than a metal ingot with the same mass.

The PM method suffers from the required use of an organic binder. The burn-off of the binder after the printing tends to result in a residue. For example, the burning of sugar (a binder) tends to result in char, which is a carbon solid. The residue is a type of contamination in the resulting product.

Electron beam sintering is expensive (due to the high vacuum required for the electron beam), requires high power and has the printed object size limited by the size of the processing chamber. Laser welding is also expensive, due to the laser. The metal arc method gives a relatively high deposition rate, but it suffers from low accuracy and low resolution, due to the difficulty of controlling the feed of the metal wire into a small liquid pool on the object that is being fabricated. Liquid metal drop/jet deposition suffers from the porosity and rippled surface morphology in the printed metal. In spite of the relatively high printing rate, the PM method is time-consuming, due to the long time needed for the sintering. In addition, powder metal is more expensive and more prone to being oxidized than bulk metal. Furthermore, the sintering associated with PM is conducted in a furnace, so that the size of the 3D printed structure is limited. Conventional 3D metal printing methods such as laser sintering, electron beam sintering, gas metal arc welding and liquid metal drop deposition do not allow fast printing and do not allow large values of the thickness or width of the printed line.

There is a strong need to develop a cost-effective method of 3D metal printing so that the method can provide a high deposition rate without the need for a very high power, as needed for the fabrication of large metal objects. Due to the economic and technical limitations mentioned above, the existing methods of 3D metal printing do not allow the fabrication of large metal objects.

Large metal objects include cars, trucks, railway cars, airframes, aircraft engines, marine vessels, sailing ship masts, street lighting poles, railway tracks, oil well casings, hydroelectric turbines, nuclear reactor control rods, windows, doors, mirrors, astronomical instruments, etc. Small metal objects include car engines, gears, fasteners, watches, cooking utensils, food containers, bicycle components, packaging, outer shells of consumer electronics, heat sinks for electronic appliances, substrates in high brightness light-emitting diode (LED) lighting, etc. The inability to make large objects causes a severe limitation to the range of products that can be made.

Moldless fabrication refers to fabrication without the use of a mold. It is necessary for 3D printing. The absence of a mold allows freeform fabrication, so that various shapes can be achieved.

An organic-based fluid refers to a fluid in which an organic liquid is the base of the fluid, so that the organic liquid is continuous in the fluid. The fluid may contain particles that are inorganic; examples of inorganic particles are metal particles and ceramic particles. However, these particles are not continuous and the fluid remains being based on the organic liquid rather than being based on the particles. Upon curing (e.g., by applying heat or ultraviolet irradiation), the organic liquid (such as a resin) in the fluid is converted to an organic solid (such as a polymer), thereby converting the fluid to a solid (a composite material) that has the organic solid as the matrix (continuous constituent) and the particles as the filler (discontinuous constituent). Such a composite material is to be distinguished from one in which the inorganic constituent is the matrix (continuous constituent). Due to the typically inferior ability of organic materials compared to inorganic materials to resist high temperatures, a composite material with an organic matrix typically has inferior ability to resist high temperatures than a composite material with an inorganic matrix.

In a commonly used method of 3D polymer printing, a thixotropic organic-based fluid is deposited layer-by-layer, thereby resulting in a 3D layered structure. Thixotropy enables the printing fluid (i.e., the fluid before printing) to be shaped by mechanical stress application during printing and furthermore allows the printed fluid (i.e., the fluid after printing) not to sag in the absence of a mold. Sagging means a change in the shape and dimensions, and makes near-net-shape fabrication infeasible.

For 3D metal printing involving the deposition of a fluid in the absence of a mold, a thixotropic metal-based fluid needs to be used. The metal-based fluid has a liquid metal as the base (the continuous constituent) of the fluid. Upon solidification, which occurs during cooling, the fluid becomes a metal-based material (with metal as the continuous constituent). However, the inadequacies of thixotropic metal-based fluids of the prior art (as explained below) make the layer-by-layer moldless deposition method ineffective or infeasible. Thus, instead of thixotropic fluid deposition, the existing methods of 3D metal printing commonly involves the welding of metal particles, using directed heat sources such as lasers and electron beams.

Semi-solid casting is a method of metal casting that involves casting a metal alloy when it is at a temperature between the solidus and liquidus. In this temperature range, the metal alloy is partly liquid and partly solid, i.e., a semi-solid (Withers, US20040261970; Jean-Pierre and Kurt, U.S. Pat. No. 5,186,236; Tetsuichi et al., US20050034837; Tetsuichi et al., US20080127777; Jian et al., US20060038328; Atsushi et al., U.S. Pat. No. 6,860,314; Norville et al., U.S. Pat. No. 6,432,160; Kono, U.S. Pat. No. 5,836,372; Garat and Loue, U.S. Pat. No. 5,630,466; Kirkwood et al., U.S. Pat. No. 5,037,489; Winter et al., U.S. Pat. No. 4,229,210; Buckley, US20030205351; Buckley, U.S. Pat. No. 6,564,856; Leatham and Ogilvy, U.S. Pat. No. 4,804,034; Fan et al., U.S. Pat. No. 6,745,818; Liu et al., US20040137218). In the context of semi-solid casting, a semi-solid refers to a mixture of a solid and a liquid.

A semi-solid typically has the solid in it being non-uniformly distributed. This is commonly due to the unequal densities of the solid and liquid in the semi-solid. If the solid has a higher density than the liquid, the solid would sin. If the solid has a lower density than the liquid, the solid would float. With this non-uniform distribution, the composition is non-uniform upon complete solidification of the semi-solid. The non-uniform composition causes the properties (e.g., the strength and the elastic modulus) to be non-uniform. In addition, the non-uniform distribution of the solid particles in a semi-solid promotes clustering of the particles. Due to the inadequate amount of liquid between the particles in a cluster, the bond between the particles in a cluster is inadequate after the complete solidification of the semi-solid. As a result, a cluster is a mechanical weak region and the presence of one or more clusters weakens the material obtained after complete solidification of the semi-solid.

A semi-solid is not necessarily thixotropic. Its degree of thixotropy is inadequate. As a result, semi-solid casting is inadequate for near-net-shape fabrication (i.e., the solid obtained after complete solidification upon cooling the semi-solid having essentially the same shape and dimensions as the semi-solid before the solidification). Furthermore, the choice of the constituents in a semi-solid is limited and the degree of thixotropy cannot be adequately controlled, as explained below.

A phase refers to a uniform span of matter. For example, at equilibrium at 0℃ and 1 atm pressure, $H_2O$ consists of two phases, which are solid ice and liquid water. However, at equilibrium at −5℃ and 1 atm pressure, $H_2O$ consists of a single phase, which is solid ice. Thus, what phases are present depends on the combination of temperature and pressure in the $H_2O$ unary (one-component) system.

A phase diagram is a map (a presentation scheme) indicating what combination of conditions (temperature, pressure and composition) gives what phase or phases at equilibrium. It is typically plotted as temperature versus composition, with the pressure fixed at 1 atm. A phase diagram is dictated by thermodynamic considerations, such as the minimization of the free energy. In other words, it is dictated by nature for any particular alloy system. Although the phases under non-equilibrium conditions (such as rapid cooling) can differ from those indicated by the phase diagram, the phase diagram provides baseline information.

As an example of an alloy system, consider a hypothetical alloy system with A and B as the components of the system, such that A and B have unlimited solid solubility in one another. The unlimited solid solubility means that A and B dissolve in one another in any proportion, resulting in a solid solution that has composition ranging from pure A (100% A) to pure B (100% B). This solid solution is denoted as α, as shown in FIG. 1, which is the binary (two-component) phase diagram of this system. The copper-nickel binary system is an example of a system that exhibits a phase diagram that is similar to that in FIG. 1.

Consider, for example, an A-B alloy with overall composition $C_o$, as indicated in FIG. 1. At equilibrium at a temperature above the liquidus (the liquidus temperature being denoted $T_L$ in FIG. 1), a single phase in the form of an A-B liquid solution (denoted L) with solution composition $C_o$ exists. The solidus is denoted $T_s$ in FIG. 1. At equilibrium at a temperature between $T_L$ and $T_S$, two phases coexist; these two phases are α (an A-B solid solution) and L. The temperature $T_1$ is a certain temperature between $T_L$ and $T_S$, as indicated in FIG. 1. Upon cooling to $T_1$ and equilibrating at this temperature, α has composition $C_α$ and L has composition $C_L$, such that L is richer in A than α, as shown in FIG. 1. As cooling occurs further in the range between $T_1$ and $T_S$, the phases are still α and L, but the compositions of both α and L change, such that both move toward the left in the phase diagram; in other words, the compositions of both α and L become closer to that of pure A. In addition, the relative proportion of α to L increases as the temperature decreases from $T_1$ and $T_S$. Along with the increase in the α proportion is the typical increase in the size of the α particles that coexist with L.

At equilibrium below $T_S$, α exists as a single phase with composition $C_o$, as shown in FIG. 1. Thus, during the process of solidification, which occurs over the temperature range from $T_L$ to $T_S$, the composition and proportion of α change, and the particle size of α typically changes as well. In general, the degree of thixotropic character of a semi-solid depends on the solid proportion and solid particle size. As a consequence, the degree of thixotropic character of the semi-solid (α+L) changes as the solidification progresses. Furthermore, the composition of the solid in the semi-solid ($C_α$ at temperature $T_1$) differs from that of the solid obtained after complete solidification ($C_o$).

As another example of an alloy system, consider a hypothetical alloy system with A and B as the components of the system, such that A and B have limited solubility with one another. This limited solubility means that A and B dissolve in one another to a limited degree, resulting in an A-rich solid solution α and a B-rich solid solution β, as shown in FIG. 2, which is the binary phase diagram of this system. The lead-tin binary system is an example of a system that exhibits a phase diagram that is similar to that in FIG. 2.

Consider, for example, an A-B alloy with overall composition $C_o$, as indicated in FIG. 2. At equilibrium at a temperature above the liquidus $T_L$ in FIG. 2, a single phase in the form of an A-B liquid solution (L) with solution composition $C_o$ exists. The eutectic temperature is denoted $T_E$ in FIG. 2. Solidification under equilibrium conditions occurs upon cooling over the temperature range from $T_L$ to $T_E$. In this temperature range, two phases exist, namely the A-rich solid solution α and the liquid solution L. At equilibrium at temperature $T_1$, which is in this temperature range, α has composition $C_α$, while L has composition $C_L$, such that α is richer in A than L. As the temperature decreases from $T_1$ toward $T_E$, both $C_α$ and $C_L$ change, such that both α and L become richer in B, in addition to the relative proportions of α and L changing. Furthermore, these changes are typically accompanied by change in the particle size of α. Therefore, the degree of thixotropic character of the semi-solid (α+L) changes during the solidification. After complete solidification, as in the case of equilibration at a temperature below $T_E$, two solid phases (α and β) exist, with α being rich in A and β being rich in B, such that the overall composition (α and β together) is $C_o$. Thus, the composition of the solid in the semi-solid ($C_α$ at temperature $T_1$) differs from those of the solid phases obtained after complete solidification (as in the case of equilibration at a temperature below $T_E$).

As yet another example of an alloy system, consider a hypothetical alloy system with A and B as the components of the system, such that solid A and solid B have no solubility in one another. The zero value of the solid solubility means that solid A is always 100% A (with no B dissolved in it) and solid B is always 100% B (with no A dissolved in it). Hence there is no solid solution. This situation is illustrated in the binary phase diagram in FIG. 3.

Consider, for example, an A-B alloy with overall composition $C_o$, as indicated in FIG. 3. At equilibrium at a temperature above the liquidus $T_L$ in FIG. 3, a single phase in the form of an A-B liquid solution (L) with solution composition $C_o$ exists. The eutectic temperature is denoted $T_E$ in FIG. 3. Solidification under equilibrium conditions occurs upon cooling over the temperature range from $T_L$ to $T_E$. In this temperature range, two phases exist, namely the A (solid) and the liquid solution L. At equilibrium at temperature $T_1$, which is in this temperature range, A has composition 100% A, while L has composition $C_L$, such that A is richer in A than L. As the temperature decreases from $T_1$ toward $T_E$, $C_L$ changes, such that L become richer in B, in addition to the proportion of A relative to L increasing. Furthermore, these changes are typically accompanied by change in the particle size of A. Therefore, the degree of thixotropic character of the semi-solid (A+L) changes during the solidification. After complete solidification, as in the case of equilibration at a temperature below $T_E$, two solid phases (A and B) exist, such that the overall composition (A and B together) is $C_o$. Thus, the composition of the solid in the semi-solid (100% A at temperature $T_1$) differs from that of the solid phase B obtained after complete solidification.

In the context of this invention, the degree of thixotropy refers to the extent of the ability of a solid-liquid mixture to maintain its shape and dimensions as cooling occurs, with the cooling causing the solid-liquid mixture to become completely solid in the absence of a mold. A strong degree of thixotropy corresponds to a strong ability to maintain the shape and dimensions as this cooling occurs.

In the context of this invention, near-net-shape fabrication refers to fabrication that gives a completely solidified material (i.e., a product) that exhibits essentially the same shape and dimensions of the corresponding material prior to complete solidification (i.e, the material used to make the product). Near net shape fabrication is attractive because it removes the need for the machining of the product. Machining is expensive, particularly if the product is high in elastic modulus and strength. In addition, machining generates waste, as it is a subtractive process.

The degree of thixotropy of a solid-liquid mixture depends on the proportions of the solid and liquid phases in the mixture, as well as depending on the compositions of the solid and liquid phases in the mixture. In relation to FIGS. 1, 2 and 3, due to the change in the proportions and compositions of the solid and liquid phases as the temperature drops within the temperature range in which solid-liquid coexistence occurs, the degree of thixotropy of the solid-liquid mixture (the semi-solid) changes as the cooling occurs. As a result, the solidification process is not adequate in terms of the extent and controllability of the near net shape fabrication.

The degree of thixotropy of a solid-liquid mixture also depends on the distance of separation between the solid particles in the mixture. The larger is the separation, the lower tends to be the degree of thixotropy. In relation to FIGS. 1, 2 and 3, due to the change in the distance between the solid particles in the solid-liquid mixture as the temperature drops within the temperature range in which solid-liquid coexistence occurs, the degree of thixotropy of the solid-liquid mixture changes as the cooling occurs.

The degree of thixotropy of a solid-liquid mixture also depends on the particle size of the solid particles in the mixture. The larger is the size, the lower tends to be the degree of thixotropy. In relation to FIGS. 1, 2 and 3, due to the change in the size of the solid particles in the solid-liquid mixture as the temperature drops within the temperature range in which solid-liquid coexistence occurs, the degree of thixotropy of the solid-liquid mixture changes as the cooling occurs.

The cooling rate affects the temperature range of the solid-liquid coexistence and also affects the proportions of the solid and liquid phases in the mixture at any given temperature in the temperature range of solid-liquid coexistence. In relation to FIGS. 1, 2 and 3, due to these effects of the cooling rate, the cooling rate affects the degree of thixotropy.

In the context of this invention, near-net-shape fabrication specifically refers to fabrication such that the shape and dimensions of the solid-liquid mixture are essentially the same as those of the completely solidified material obtained by the cooling of the solid-liquid mixture. Without a strong and controlled degree of thixotropy of the solid-liquid mixture, the near net shape fabrication cannot be adequately controlled or achieved.

Although the above explanation is in terms of three examples of phase diagrams, the issues generally apply to any alloy system that involves a temperature range in which solid and liquid phases coexist. Such alloy systems are not limited to those illustrated in FIGS. 1, 2 and 3.

Adequate mechanical properties in terms of reasonably high values of both the elastic modulus and the tensile strength are important for structural applications. The elastic modulus describes the stiffness in the elastic deformation regime, i.e., the amount of stress per unit strain in this regime. The tensile strength describes the highest stress the material can withstand before breaking. The elastic deformation regime is relevant to normal structural operation. In other words, normal structural operation should not involve permanent deformation (plastic deformation) or fracture. Both permanent deformation and fracture occur beyond the elastic regime.

The compositions and relative proportions of the phases in an alloy after complete solidification largely dictate the mechanical properties of the alloy. Since the compositions and relative proportions of the phases are governed by the phase diagram, there is little freedom to choose the compositions and relative proportions of the phases after the cooling. In other words, the choice is very restrictive.

An adequately low value of the CTE is important for structural applications that involve elevated temperatures, because the dimensional changes during heating (thermal expansion) or dimensional changes during cooling (thermal contraction) can be disadvantageous in relation to the operation, reliability and durability of the structure. In case that the structure involves deposition (solidification) of a material as a layer on top of the same material that has already fully solidified and cooled, a low CTE value is important for minimizing the thermal stress and hence improving the bond between the two layers. The compositions and relative proportions of the phases in an alloy after complete solidification largely dictate the CTE value of the alloy. Since the compositions and relative proportions of the phases are governed by the phase diagram, there is little freedom to choose the compositions and relative proportions of the phases after the cooling.

Although solid-liquid coexistence is possible in an alloy under appropriate combinations of overall alloy composition and temperature, the choices of overall alloy composition and the solid-to-liquid proportion are both very limited. In addition, the compositions and proportions of the solid and liquid that coexist cannot be independently chosen, as they are dictated by the phase diagram.

Numerous alloys with solid-liquid coexistence (such as the lead-tin solder alloys) have melting temperatures that are too low or mechanical properties that are too poor for them to be used in practice for structures such as cars. In addition, the lead in the lead-tin alloy is poisonous and is thus an environmental hazard.

A composite material is a material obtained by the artificial combination of different component materials. An example is a composite material obtained by the artificial combination of carbon fibers and a polymer (e.g., epoxy). In this example, there are two components (i.e., carbon fibers and polymer); the polymer is the continuous phase while the carbon fibers are the discontinuous phase. The continuous phase serves as the binder, which serves to bind the fibers together; it is known as the matrix. This composite is an example of a polymer-matrix composite, which refers to a composite that involves a polymer as the matrix (binder).

Another example of a composite material is one obtained by the artificial combination of silicon carbide particles and aluminum. Aluminum is one of the most widely used structural metals. Due to its low density (2.70 g/cm$^3$), aluminum is widely used for lightweight structures such as aircraft structures. Aluminum has a relatively low melting temperature of 660℃. Silicon carbide (SiC) is a ceramic material that is widely used as an abrasive, due to its high hardness. Silicon carbide has a high melting temperature of 2730℃. In this example, there are two components (i.e., SiC and aluminum); aluminum is the continuous phase while the SiC particles are the discontinuous phase. The continuous phase is the matrix and serves to bind the SiC particles together. This composite is an example of a metal-matrix composite, which refers to a composite that involves a metal (or metal alloy) as the matrix (binder) (Jin et al., U.S. Pat. No. 5,221,324; Skibo and Schuster, U.S. Pat. No. 4,786,467; Yamamura et al., U.S. Pat. No. 4,622,270; Jatkar et al., U.S. Pat. No. 4,623,388; Choe et al., US20100326739; Morelli et al., US20050085030; Hayashi and Takeda, U.S. Pat. No. 5,372,775; Fox et al., U.S. Pat. No. 6,630,247; Ferrando et al., U.S. Pat. No. 5,858,460; Lhymn and Lhymn, U.S. Pat. No. 5,223,347).

In the context of this Specification, an alloy refers to a metal alloy. An alloy is not a composite material, even if the alloy comprises multiple phases. This is because the phases in an alloy are dictated by nature, in accordance with the combination of temperature, pressure and overall alloy composition. The criteria used by nature involve materials science considerations, such as free energy minimization and phase transformation kinetics. In other words, the phases in an alloy occur naturally and are not present due to an artificial combination of the phases.

The alloy composition refers to the composition of the overall alloy, which includes all the phases in the alloy. The alloy composition is to be distinguished from the phase composition, which refers to the composition of a certain phase.

For example, in the lead-tin binary (two-component) material system, the phases are the lead-rich solid solution, the tin-rich solid solution and the liquid tin-lead solution, such that the phases present and the proportions of coexisting phases depend on the combination of temperature, pressure and alloy composition. Under a certain combination of these conditions, the phases present are the tin-rich solid solution and the lead-rich solid solution, so that the alloy consists of two solid phases; under a certain other combination of conditions, the phases present are the tin-rich solid solution and the liquid tin-lead solution, so that the alloy consists of a solid phase and a liquid phase. The combination of conditions governs not only what phase is present (or what phases are present), it also governs the composition and proportion of each phase present. Each of the phases (the tin-rich solid solution, the lead-rich solid solution and the tin-lead liquid solution) can exhibit a range of composition, with the range depending on the temperature and pressure.

A metal-matrix composite is a composite material with a metal as the continuous phase (the matrix) and a filler as the discontinuous phase. The metal and filler are, in general, different in density and composition.

A method of metal-matrix composite fabrication is stir casting, which refers to a method in which the filler is added to the liquid metal and the mixture is stirred. The mixture is then cast into a mold in which the mixture solidifies to form the metal-matrix composite. In case that the composite is made by stir casting, the filler is non-uniformly distributed, due to the difference in density between the filler and the liquid metal. If the filler has a higher density than the liquid metal, it would sink. If the filler has a lower density than the liquid metal, it would float. Stirring helps to increase the degree of uniformity in the filler distribution. However, stirring has to stop before the start of solidification, and the non-uniformity problem returns once the stirring is stopped.

The non-uniformity in the filler distribution after solidification causes non-uniform distribution of the properties (such as the strength and the elastic modulus) in the resulting metal-matrix composite. In addition, the non-uniformity in the filler distribution prior to solidification promotes clumping of the filler units (such as the filler particles). The clumping is not desirable, because the bond between the filler units in a clump is relatively poor, thus causing the mechanical properties of the overall composite to be inadequate.

Another shortcoming of the stir casting method of metal-matrix composite fabrication is that the filler volume fraction is limited to low values, as the viscosity of the mixture of liquid metal and filler increases with the filler volume fraction and stirring is increasingly difficult as the viscosity increases. The low filler volume fraction makes it difficult for the mixture to exhibit thixotropic behavior.

Another method of metal-matrix composite fabrication is powder metallurgy. In this method, a mixture of metal matrix powder and the filler is subjected to pressure and heat so as to consolidate the mixture and cause the metal matrix powder to diffuse in the solid state. This diffusion causes the metal matrix powder particles to bond to one another and to the dispersed filler, thereby forming a monolith, which is the metal-matrix composite. This process is also known as sintering. Powder metallurgy is a solid-state process, without the need for melting the metal matrix material. Thus, no fluid is involved. However, because it is a solid-state process, it is slow and takes a long time.

A short coming of the powder metallurgy method of metal-matrix composite fabrication is that the volume fraction of the filler is limited to low values. This limitation is because a high filler volume fraction corresponds to a low metal matrix volume fraction and adequate bonding between the metal matrix and the filler requires an adequate volume fraction of the metal matrix, which is the constituent that is responsible for the bonding.

Another shortcoming of the powder metallurgy method of metal-matrix composite fabrication is that the size of the composite article is limited by the required high pressure in the fabrication process. Since the pressure is the force divided by the area on which the force is applied, a large area would require a high force in order to achieve the required pressure. The higher is the force, the more expensive is the press (equipment) involved. Therefore, this method can be used for making small objects such as gears, but it cannot be used for the fabrication of large objects such as cars.

Yet another method of metal-matrix composite fabrication is liquid metal infiltration (also known as squeeze casting). In this method, liquid metal is squeezed into the empty space among the filler units (e.g., the filler particles) in a filler preform. The preform refers to a porous object that mainly consists of the filler units, with the pores (empty space) in the preform being among the filler units. Immediately after the infiltration, cooling occurs, so that the liquid metal solidifies, thus resulting in a metal-matrix composite. This method involves the flow of the liquid metal. In other words, the fluid is the liquid metal, which is not thixotropic. The filler units are stationary throughout the process, so that the shape and dimensions of the resulting metal-matrix composite are essentially the same as those of the preform. By not distorting the shape of the preform during the liquid metal infiltration, near-net-shape fabrication is achieved. In order to avoid distortion of the shape of the preform, movement of the filler units in the preform should be avoided. For the purpose of avoiding substantial movement of the filler units, a small amount of a binder (e.g., colloidal silica) is commonly incorporated in the preform during preform preparation. The binder causes the filler units to be essentially locked in their positions, so that the filler units cannot move relative to one another. Instead of using a binder, the preform can be sintered, so that the filler units are bonded together at their points of contact by solid-state diffusion and thus cannot move relative to one another.

A shortcoming of the liquid metal infiltration method of metal-matrix composite fabrication is that the size of the composite is limited by the size of the preform. The size of the preform is in turn limited by the size of the container used for the infiltration process. Therefore, the size of the composite articles made with this technique is limited. This method can be used for making small objects such as gears, but it cannot be used for the fabrication of large objects such as cars.

Still another method of metal-matrix composite fabrication is thermal spraying. In this method, a metal in a powder or wire form is melted into tiny droplets using a heat source (such as a flame). These droplets, mixed with a particulate filler, are sprayed onto a substrate at a high velocity. Due to the high speed of solidification of the droplets, which arrive at the substrate one after another, the solidified material (i.e., the resulting metal-matrix composite) has a relatively high level of porosity. The porosity is detrimental to the mechanical properties. Therefore, the solidified material needs to be subjected to annealing, so as to reduce the porosity. The annealing takes a long time.

Yet another method of metal-matrix composite fabrication is a variation of semi-solid casting that involves casting a mixture of a semi-solid and a filler. The filler is commonly in the form of particles. The semi-solid is an alloy that consists of solid and liquid phases that coexist. The solid phase in the semi-solid is to be distinguished from the filler. The semi-solid may provide a degree of thixotropy to the mixture, if the filler volume fraction is low. However, the degree of thixotropy of the mixture is low, if any.

The filler in a metal-matrix composite is commonly a discontinuous phase, such as particles and short fibers. (Continuous fibers can also serve as the filler, but their incorporation in a composite material cannot involve the mechanical mixing of the fibers and the matrix constituent, as such mixing would make the fibers not straight and may even break the fibers.)

Creep refers to the permanent deformation of a solid due to the temperature being high enough for the solid to exhibit a degree of viscous character. For a metal (not a metal-matrix composite), creep typically occurs at temperatures above about ⅓ of the melting temperature of the metal in Kelvin (not Centigrade). Thus, the higher is the melting temperature of a metal, the greater is the creep resistance of the metal. Creep becomes more severe in the presence of long-term exposure to stress, which can be below the yield strength of the material.

An alloy (to be distinguished from a metal-matrix composite) can be high in creep resistance only if it has a very high melting temperature. Examples of metals with high melting temperatures are tungsten (which has melting temperature 3422 °C) and molybdenum (which has melting temperature 2623 °C). Metals with high values of the melting temperature are known as refractory metals. Casting is a process that involves melting. The high melting temperature causes the casting to require high temperatures, so that the casting consumes much energy and becomes an impractical processing method.

The refractory metals also suffer from the high values of the density. For example, the density of tungsten is 19.25 g/cm$^3$, and the density of molybdenum is 10.28 g/cm$^3$. In contrast, the density of aluminum is only 2.70 g/cm$^3$. The preference for low density (as needed for lightweight structures) limits the choice of alloys.

For 3D metal printing involving layer-by-layer deposition, it is necessary for the creep resistance of the printed material to be sufficiently high. Otherwise, the solidified printed material undergoes creep (dimensional change), particularly before it has cooled sufficiently. Because the dimensions of the printed material should be nearly the same as that of the thixotropic printing material, creep is not desirable. Except for the refractory metals, alloys have low creep resistance. The requirement of high creep resistance limits the choice of alloys.

For 3D metal printing involving layer-by-layer deposition, it is necessary for the CTE of the printed material to be sufficiently low. Otherwise, the thermal stress resulting from the thermal contraction of one layer on top of a layer that has already cooled (already undergone thermal contraction) would weaken the interface between the layers, thus resulting in inadequate bonding between the layers and poor mechanical properties for the resulting 3D structure. Except for the refractory metals, alloys have high CTE values. The requirement of low CTE further limits the choice of alloys.

A metal laminate refers to a plurality of metal layers that are bonded together. For example, aluminum laminates are obtained by the diffusion bonding of aluminum layers together under heat and pressure (Faruque et al., US20140335368). As pressure can cause a degree of deformation of the metal, the pressure application affects the thickness of the laminate. Furthermore, since pressure is equal to the force divided by the area on which the force is applied, the force required for achieving a given pressure is high if the area is large. As a result, the area of the laminate that can be fabricated by diffusion bonding is limited.

The present invention is directed to overcoming these and other deficiencies in the art.

SUMMARY OF THE INVENTION

This invention provides liquid-metal-based thixotropic fluids that, upon solidification with or without a mold, provide metal-matrix composite materials. The fluids are in the form of a liquid metal with dispersed solid particles. The particles exhibit the ability to move substantially relative to one another. The liquid is essentially continuous; the solid is substantially discontinuous. The liquid substantially occupies the separation among the solid particles and essentially occupies a portion of the separation. The portion consists of a plurality of regions. Each region is in contact with the surface of a particle.

This invention also provides a laminate consisting of metal-matrix composite layers that are essentially parallel to one another and bonded to one another. Each of the layers consists of a metal-matrix composite, which consists of a metal matrix and a filler, such that the melting temperature of the filler is substantially higher than the melting temperature of the metal matrix. The filler consists of particles, which are of size ranging from 0.01 μm to 50 μm. The particles are dispersed in the composite and exhibit a substantially lower value of the CTE than the metal, and a substantially higher value of the elastic modulus than the metal. The metal-matrix composite is derived from a fluid.

This invention further provides a method of making a metal-based structure in the absence of a mold, with relevance to three-dimensional metal printing. This method comprises preparing, shaping and depositing the thixotropic fluid on a substrate, and allowing the fluid to cool for complete solidification of the fluid.

DETAILED DESCRIPTION OF THE INVENTION

This invention provides liquid-metal-based thixotropic fluids that, upon solidification with or without a mold, provide metal-matrix composite materials. Due to the thixotropic character of the fluid, the metal-matrix composite obtained by the solidification of the fluid upon cooling has essentially the same shape and dimensions as the fluid before the solidification, even in the absence of a mold. Furthermore, the composite exhibits high values of the elastic modulus and strength, high creep resistance and low values of the CTE.

Figure 1:
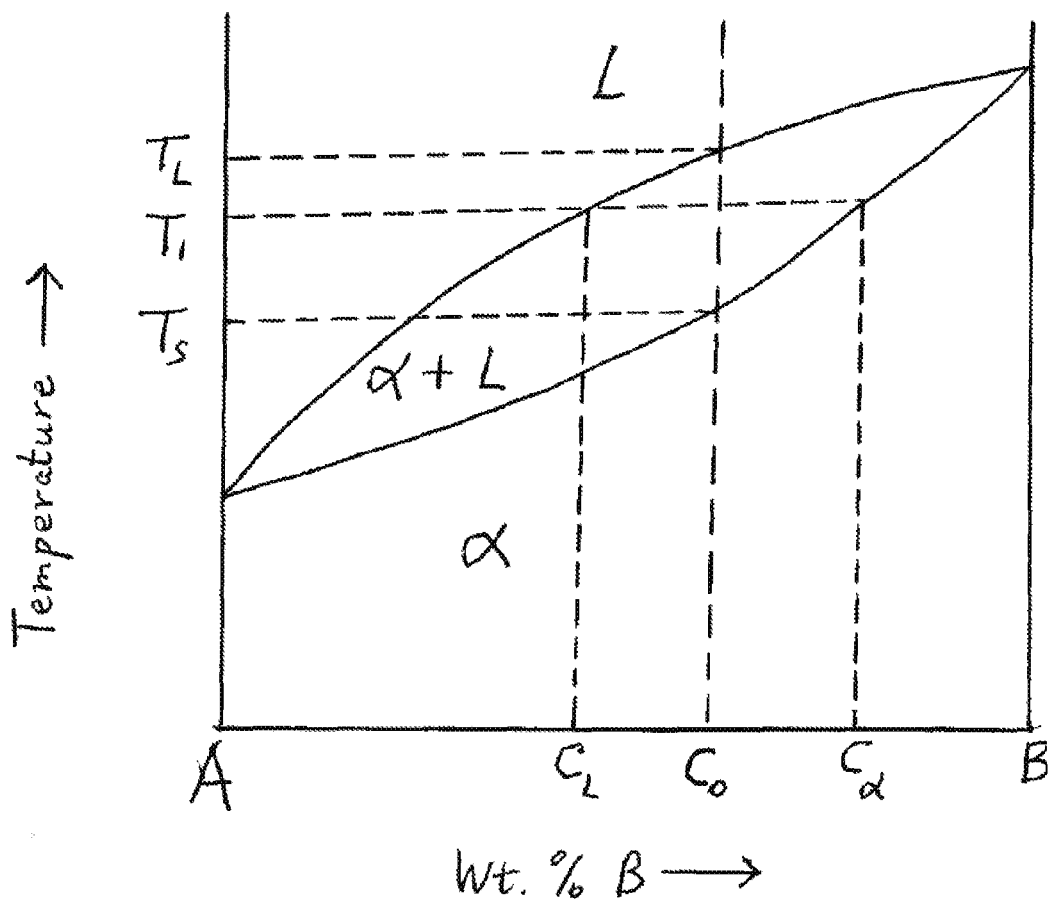
FIG. 1 shows a hypothetical A-B binary phase diagram to illustrate the changes in phase during solidification that involves the existence of a semi-solid during the process of solidification. In this A-B binary system, A and B are the components, which exhibit unlimited solid solubility in one another.
Figure 2:
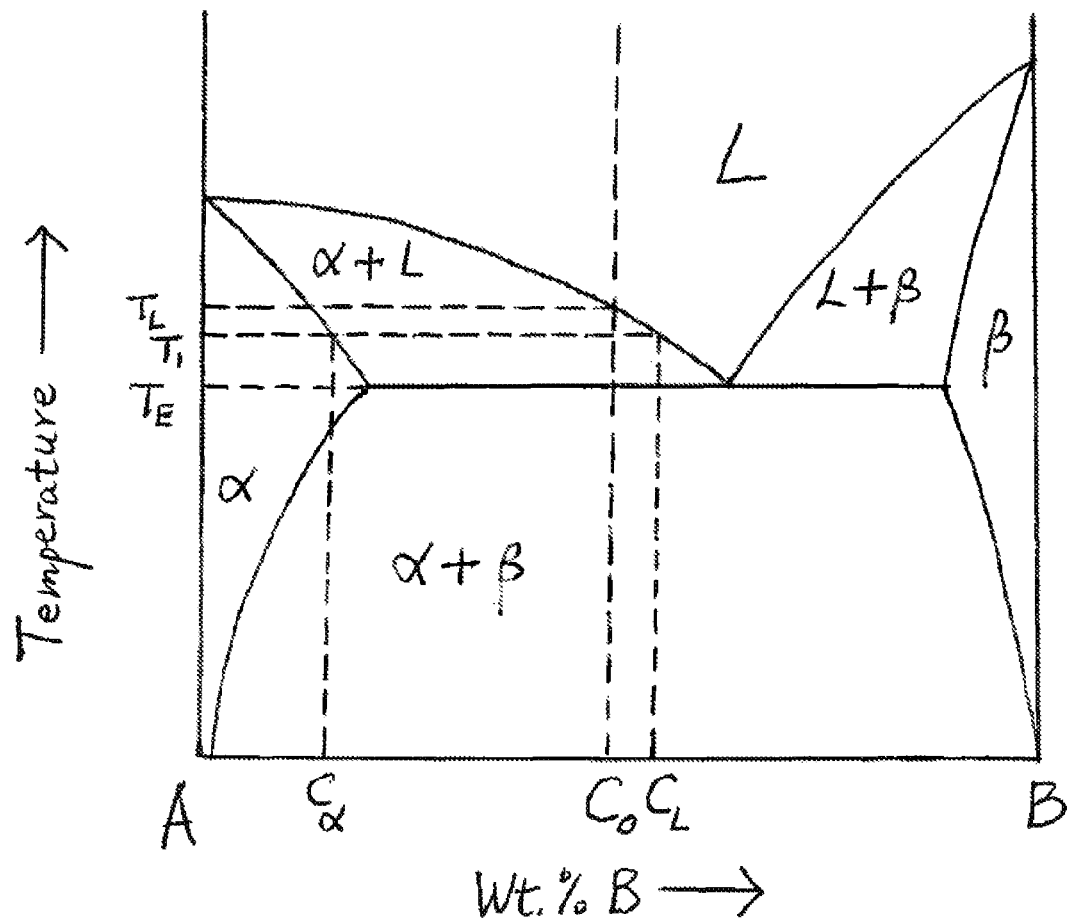
FIG. 2 shows a hypothetical A-B binary phase diagram to illustrate the changes in phase during solidification that involves the existence of a semi-solid during the process of solidification. In this A-B binary system, A and B are the components, which exhibit limited solid solubility in one another.
Figure 3:
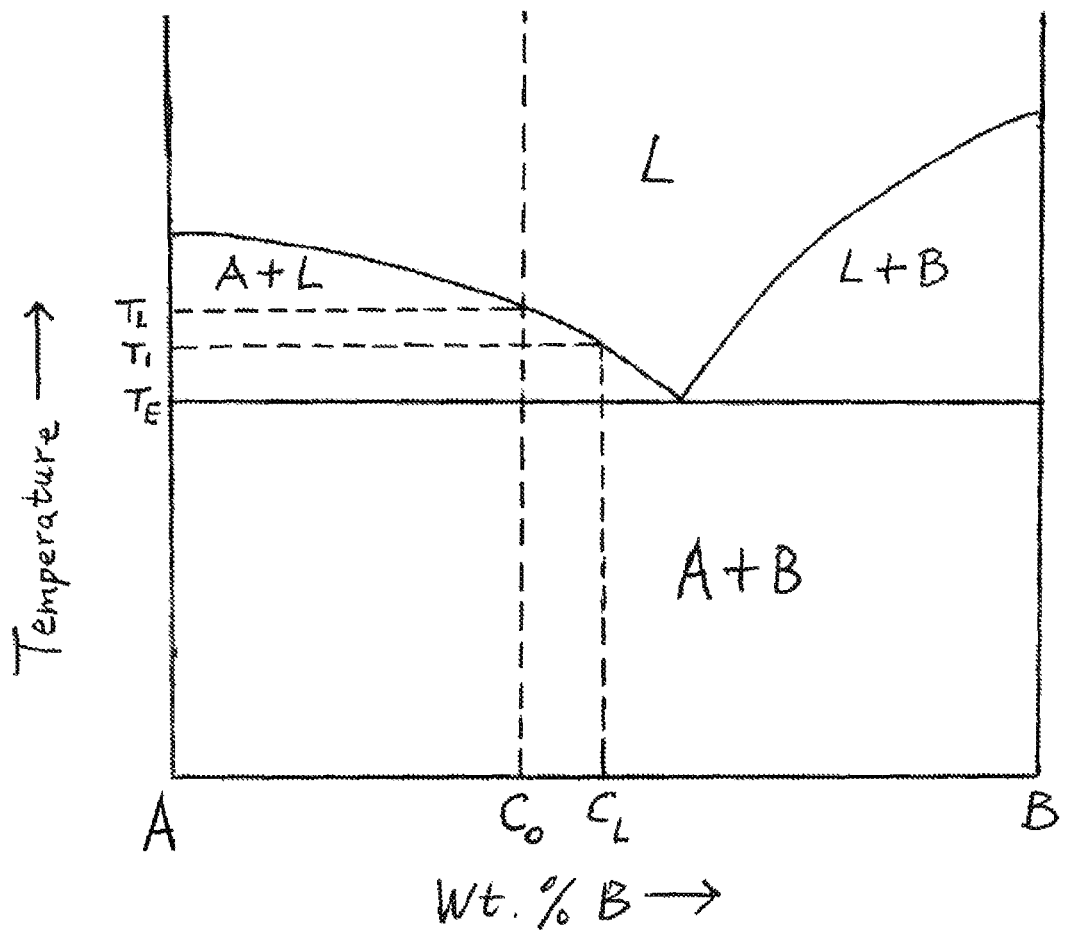
FIG. 3 shows a hypothetical A-B binary phase diagram to illustrate the changes in phase during solidification that involves the existence of a semi-solid during the process of solidification. In this A-B binary system, A and B are the components, which exhibit no solid solubility in one another.
Figure 4:
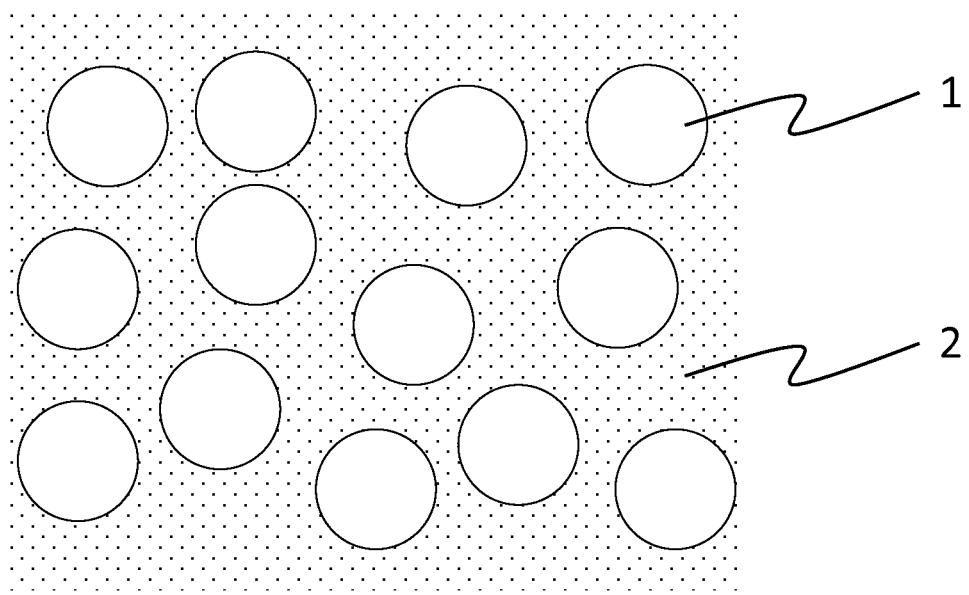
FIG. 4 shows an illustration of the fluid of this invention. In this drawing, 1 refers to the solid particles, and 2 refers to the liquid metal.

The thixotropic fluids of this invention are in the form of a liquid metal with dispersed solid particles of size ranging from 0.01 µm to 50 µm, as illustrated in FIG. 4, such that the liquid exhibits the ability to solidify upon cooling. The particles can have various shapes, including equiaxed, spherical, flake, acicular and other shapes. However, the spherical shape is preferred.

The liquid metal mentioned in the last paragraph can be an elemental liquid (such as liquid aluminum) or a liquid alloy (such as a liquid aluminum-silicon alloy). The liquid metal does not comprise any solid.

The liquid in the fluid is essentially continuous. The degree of continuity of the liquid can be reduced to a minor degree by increasing the porosity. The degree of continuity of the liquid can be reduced to a minor degree by increasing the degree of continuity of the solid.

The solid in the fluid is substantially discontinuous. The degree of continuity of the solid can be increased (i.e., the degree of discontinuity of the solid is decreased) by having the solid particles touch one another to a greater degree. If all the particles are separate from one another, such that none of the particles touches any of its adjacent particles, the degree of continuity of the solid would be at its minimum (i.e., the degree of discontinuity of the solid would be at its maximum). If the particles cluster together to form a plurality of clusters, such that a plurality of particles touch one another to form a cluster, the degree of discontinuity would be lower than the case in which there is no clustering. If the adjacent particles touch one another, such that the particles form a network that extends essentially throughout the fluid, the degree of continuity of the solid would be at its maximum (i.e., the degree of discontinuity of the solid would be at its minimum).

Figure 6:
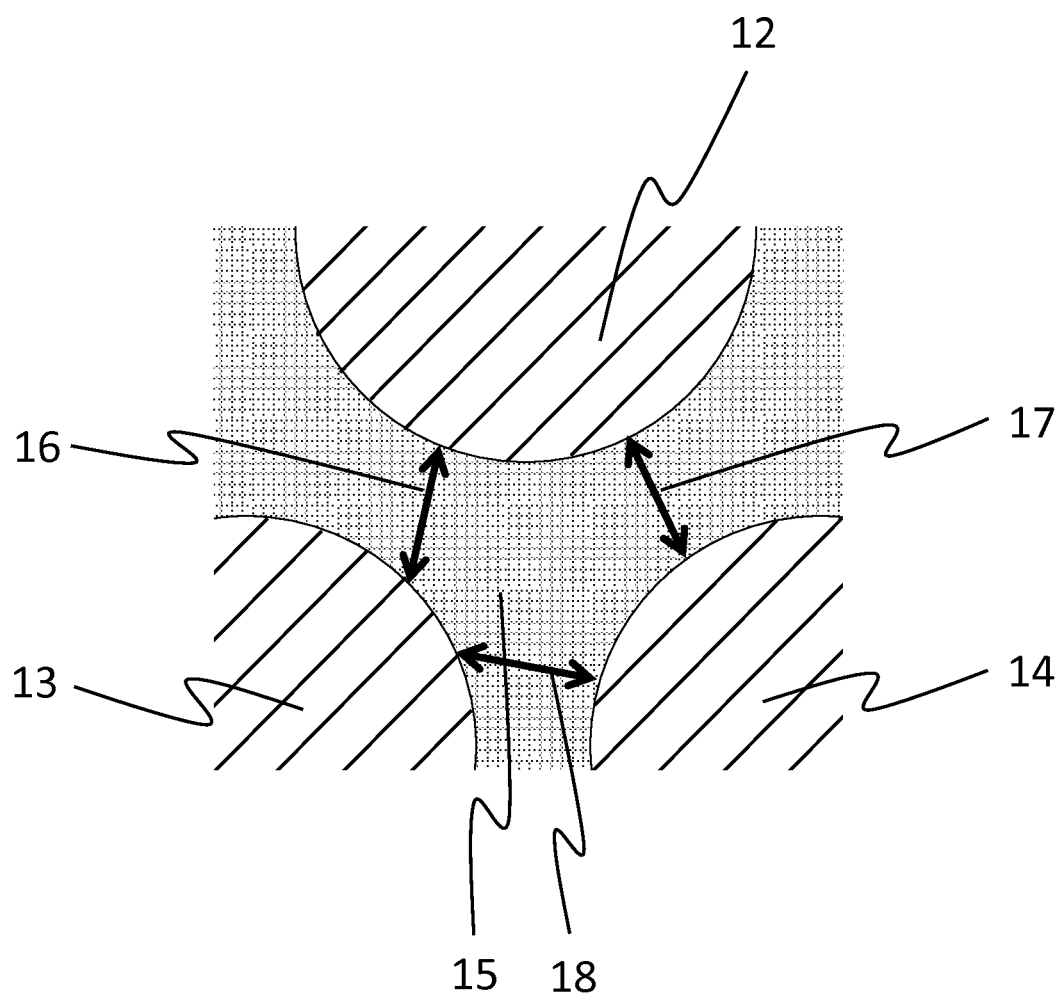
FIG. 6 shows an illustration of three particles (12, 13 and 14) that are in close proximity, with separation 15 among these particles. This separation is substantially occupied by the liquid in the fluid. The distance 16 is a representative distance between particles 12 and 13 within separation 15. The distance 17 is a representative distance between particles 12 and 14 within separation 15. The distance 18 is a representative distance between particles 13 and 14 within separation 15. A representative distance is typically larger than the minimum distance and is approximately equal to the average distance. Only a part of each of the three particles (12, 13 and 14) is shown in this illustration.

The solid particles are substantially separate. The separation among the particles (as illustrated in FIG. 6) is sufficiently small (with the interparticle spacing ranging from 0.01 µm to 50 µm, preferably ranging from 0.01 µm to 10 µm). Due to the geometry of packing of the particles, the small dimension of the separation can be obtained by the use of particles that are sufficiently small in size. The dimension of the separation can be decreased by increasing the volume fraction of particles in the fluid. The liquid substantially occupies this separation (preferably occupying more than 50% of the volume of this separation).

Figure 7:
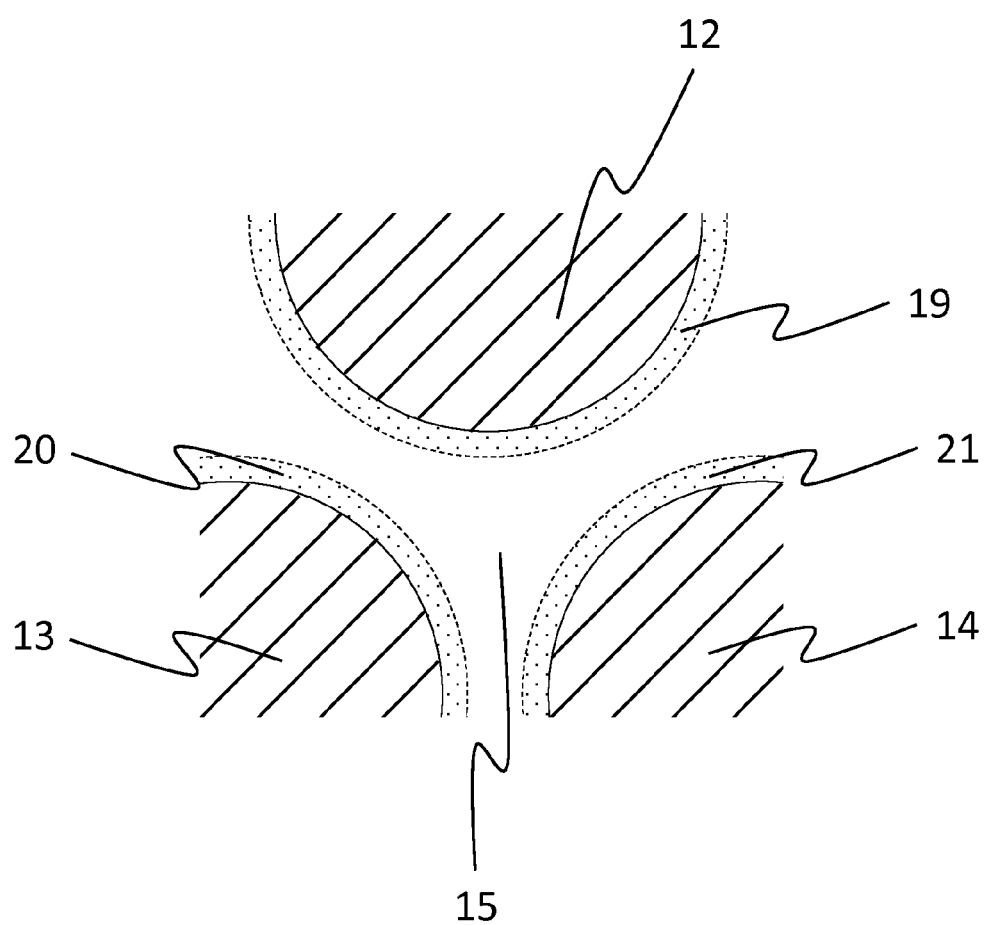
FIG. 7 shows an illustration of three particles (12, 13 and 14) that are in close proximity, with separation 15 among these particles. A portion of this separation consists of three regions (19, 20 and 21). Region 19 is in contact with the surface of particle 12; region 20 is in contact with the surface of particle 13; region 21 is in contact with the surface of particle 14. Only a part of each of the three particles (12, 13 and 14) is shown in this illustration. Regions 19, 20 and 21 constitute a portion of separation 15. This portion is essentially occupied by the liquid in the fluid.
Figure 8:
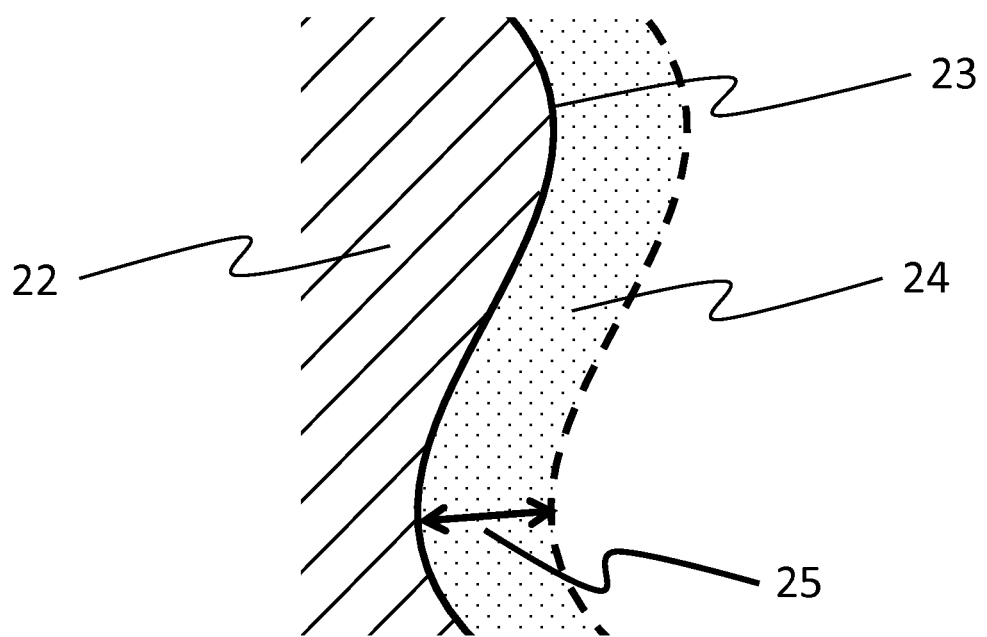
FIG. 8 shows an illustration of a part of a particle 22 and its surface 23, along with the region 24 that is in contact with the surface 23. This region extends over a distance 25 ranging from 0.01 µm to 50 µm from the surface 23.

In addition, the liquid essentially occupies a portion of the separation. This portion consists of a plurality of regions, with each region being in contact with the surface of a particle. This is illustrated in FIG. 7, where three regions (19, 20 and 21) are shown. The particles and the liquid are essentially in contact at the interface between the particles and the liquid. The number of regions in a portion depends on the number of particles that surround the separation. In FIG. 7, three particles surround the separation, so there are three regions. Each region extends over a distance ranging from 0.01 µm to 50 µm from the particle surface (as illustrated in FIG. 8). The liquid preferably occupies more than 80% of the volume of each region.

The essential occupation of the abovementioned portion by the liquid can be obtained by the appropriate choice of the combination of liquid and particles, such that the liquid adequately wets the particle surface. Wetting means that the liquid spreads on the particle surface rather than balling up on the surface, as enabled by the relatively low energy of the interface between the liquid and the particle surface. For example, a liquid metal tends to wet the surface of a ceramic particle that has been coated with a metal. In other words, the wettability of the ceramic particle by the liquid metal is enhanced by coating the ceramic particle with a metal.

The essential occupation of the abovementioned portion by the liquid can alternatively be obtained by the appropriate choice of the combination of liquid and particles, such that the liquid reacts with the particles to a degree. The reactivity causes the liquid and particles to have an affinity for one another. For example, aluminum liquid reacts with silicon carbide particles through the chemical reaction

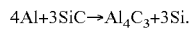

$$4Al + 3SiC \rightarrow Al_4C_3 + 3Si.$$

The essential occupation of the abovementioned portion by the liquid can alternatively be obtained by the use of an adequate pressure on the liquid so as to squeeze the liquid against the surface of the particles (which are quite closely packed) during the making of the fluid. The higher is the pressure, the more intimate is the interface between the liquid and the particles. An intimate interface is associated with little, if any, porosity at the interface. The porosity pertains to voids that are filled with gas or air.

This invention is in contrast to semi-solid casting in that (i) the solid obtained from the liquid metal by solidification upon cooling exhibits essentially the same composition as the liquid metal, (ii) the solid particles obtained by the solidification exhibit essentially the same composition as the these particles before the solidification, (iii) the solid particles obtained by the solidification exhibit essentially the same size as these particles before the solidification, and (iv) the volume fraction of the solid particles after the solidification is essentially equal to the volume fraction of these particles in the fluid before the solidification.

A high melting temperature of a filler gives the filler high creep resistance. As a result, the presence of a filler with a high melting temperature in a metal-matrix composite restrains the metal matrix from creep, even though the metal matrix (when present alone) may creep significantly at the same temperature. Thus, the creep resistance of the metal-matrix composite is superior to that of the metal matrix material. Therefore, a metal-matrix composite tends to exhibit superior ability to resist elevated temperatures than the material in the form of the corresponding metal matrix by itself (i.e., the metal matrix alone).

Creep resistance is valuable for shape or dimensional control, in addition to providing high temperature ability to the composite. In general, creep limits the ability of a metal to resist high temperatures. By enhancing the creep resistance, a material can resist higher temperatures, so that even a metal with a relatively low melting temperature (e.g., aluminum) can be used at a relatively high temperature (higher than the temperatures at which the unreinforced metal can be used).

An alloy that is partially liquid and partially solid does not typically contain a solid that is sufficiently high in the elastic modulus, sufficiently high in creep resistance, or sufficiently low in the CTE. This is in contrast to the ceramic particles that are commonly used as a filler in a metal-matrix composite, as ceramic particles tend to have high elastic modulus, high creep resistance and low CTE. Therefore, an alloy based on metal A does not provide the creep resistance, low CTE, high strength or high modulus that a metal-matrix composite based on metal A provides.

For effectiveness of using the abovementioned thixotropic fluid for 3D metal printing, the chosen solid particles should have a melting temperature and an elastic modulus that are substantially higher than those of the solid obtained by the solidification of the liquid metal and a CTE that is substantially lower than that of the solid obtained by the solidification of this liquid metal. Numerous ceramic, carbon and other inorganic solids exhibit this combination of properties, so the choice of the solid for the particles is wide. An example of a choice of the solid for the particles is silicon carbide (SiC), which is a ceramic material with a high melting temperature (2,730 °C), a high elastic modulus (450 GPa), and a low CTE ($2.8 \times 10^{-6}$/°C). Another example of a choice of the solid for the particles is aluminum nitride (AlN), which is a ceramic material with a high melting temperature (2,200 °C), a high elastic modulus (330 GPa), a low CTE ($4.5 \times 10^{-6}$/°C) and a relatively high thermal conductivity.

The metal-matrix composite obtained from the thixotropic fluid by solidification exhibits low CTE, high creep resistance and excellent mechanical properties (high strength and high elastic modulus). Due to the substantial proportion of solid particles (ranging from 40 vol. % to 70 vol. %) in the fluid and the properties of the particles mentioned in the last paragraph, the chosen metal for forming the metal matrix in the composite does not need to have a high melting temperature, a high modulus or a low CTE. Thus, the choice of metal for the metal matrix is wide. An example of a choice of metal for the metal matrix is aluminum, which has a low melting temperature (660 °C), a low modulus (69 GPa) and a high CTE of $22 \times 10^{-6}$/°C. Another example of a choice of metal for the metal matrix is magnesium, which has a low melting temperature (650 °C), a low modulus (45 GPa), and a high CTE ($25 \times 10^{-6}$/°C).

Due to the relatively high proportion (ranging from 40 vol. % to 70 vol. %) of solid particles in the fluid, the particles are in close proximity, such that they are mostly almost in contact with one another. As a consequence of this high packing density, the particles in the fluid cannot shift relative to one another to any significant degree, thus causing the particle distribution to be essentially maintained. Therefore, the particle distribution tends to substantially uniform in both the fluid and the metal-matrix composite resulting from the complete solidification of the fluid.

Typically for materials in general, a higher melting temperature is associated with a higher elastic modulus and a lower CTE. This is because a relatively high melting temperature, a relatively high elastic modulus and a relatively low CTE all reflect relatively high bond strength in the material.

Comparison of the values of the melting temperature, elastic modulus and CTE of silicon carbide and aluminum in the last two paragraphs indicates that the melting temperature of silicon carbide is much higher than that of aluminum, the elastic modulus of silicon carbide is much higher than that of aluminum, and the CTE of silicon carbide is much lower than that of aluminum.

Comparison of the values of the melting temperature, elastic modulus and CTE of aluminum nitride and aluminum indicates that the melting temperature of aluminum nitride is much higher than that of aluminum, the elastic modulus of aluminum nitride is much higher than that of aluminum, and the CTE of aluminum nitride is much lower than that of aluminum.

Comparison of the values of the melting temperature, elastic modulus and CTE of silicon carbide and magnesium indicates that the melting temperature of silicon carbide is much higher than that of magnesium, the elastic modulus of silicon carbide is much higher than that of magnesium, and the CTE of silicon carbide is much lower than that of magnesium.

Comparison of the values of the melting temperature, elastic modulus and CTE of aluminum nitride and magnesium indicates that the melting temperature of aluminum nitride is much higher than that of magnesium, the elastic modulus of aluminum nitride is much higher than that of magnesium, and the CTE of aluminum nitride is much lower than that of magnesium.

The properties (e.g., elastic modulus and CTE) of a composite is commonly calculated from the properties and volume fractions of the constituents using a simple calculation method known as the Rule of Mixtures. This rule involves weighted averaging, with the weighting factors being the volume fractions of the constituents.

The rule for the elastic modulus is expressed by the following equation:

$$E_c = V_p E_p + V_m E_m,$$

where $E_c$ is the elastic modulus of the composite, $E_p$ is the elastic modulus of the particles (filler in the composite), $E_m$ is the elastic modulus of the matrix of the composite, $V_p$ is the volume fraction of the particles, and $V_m$ is the volume fraction of the matrix. The Rule of Mixtures for CTE is expressed by the following equation:

$$C_c = V_p C_p + V_m C_m,$$

where $C_c$ is the CTE of the composite, $C_p$ is the CTE of the particles (filler in the composite), $C_m$ is the CTE of the matrix of the composite, $V_p$ is the volume fraction of the particles, and $V_m$ is the volume fraction of the matrix.

With the porosity in the composite neglected, and with only two constituents (particles and matrix) present in the composite, $$V_p + V_m = 1$$

for both the Rule of Mixtures for the elastic modulus and the Rule of Mixtures for the CTE.

For the case in which $V_p = V_m = 0.5$ (which is within the preferred range taught by this invention), $E_c$ is just the simple average of $E_p$ and $E_m$. Hence, the elastic modulus of the composite with aluminum as the matrix and silicon carbide as the particles is the average of 69 GPa (for aluminum, from Engineering Toolbox, http://www.engineeringtoolbox.com/young-modulus-d_417.html) and 450 GPa (for silicon carbide, from Engineering Toolbox, http://www.engineeringtoolbox.com/young-modulus-d_417.html), i.e., 260 GPa, and the elastic modulus of the composite with aluminum as the matrix and aluminum nitride as the particles is the average of 69 GPa (for aluminum, from Engineering Toolbox, http://www.engineeringtoolbox.com/young-modulus-d_417.html) and 330 GPa (for aluminum nitride, from http://accuratus.com/alumni.html), i.e., 200 GPa. In spite of the fact that, for either SiC or AlN composite, the composite modulus is lower than the particle modulus, it is much higher than the matrix modulus.

For the case in which $V_p = V_m = 0.5$ (which is within the preferred range taught by this invention), $C_c$ is just the simple average of $C_p$ and $C_m$. Hence, the CTE of the composite with aluminum as the matrix and silicon carbide as the particles is the average of $23.0 \times 10^{-6}/°C$ (for aluminum, from Engineering Toolbox, http://www.engineeringtoolbox.com/thermal-expansion-metals-d_859.html) and $2.77 \times 10^{-6}/°C$ (for silicon carbide, from Engineering Toolbox, http://www.engineeringtoolbox.com/linear-expansion-coefficients-d_95.html), i.e., $12.4 \times 10^{-6}/°C$, and the CTE of the composite with aluminum as the matrix and aluminum nitride as the particles is the average of $23.0 \times 10^{-6}/°C$ (for aluminum, from Engineering Toolbox, http://www.engineeringtoolbox.com/thermal-expansion-metals-d_859.html) and $4.5 \times 10^{-6}/°C$ (for aluminum nitride, from http://accuratus.com/alumni.html), i.e., $13.7 \times 10^{-6}/°C$. In spite of the fact that, for either the SiC composite or the AlN composite, the composite CTE is higher than the particle CTE, the composite CTE is much lower than the matrix CTE.

The high value of the elastic modulus and the low value of the CTE of the composite stem from the high value of the elastic modulus and the low value of the CTE for the particles. Therefore, the choice of particles with a high value of the elastic modulus and a low value of the CTE is an aspect of the teaching of this invention.

There are various aluminum alloys, which differ in the type and concentration of the alloying element(s). The elastic modulus of aluminum alloys (alloy No. 443, 1060, 1100, 3003, 3004, 6063, as listed in Engineering Toolbox) is 69 GPa at 21°C, and decreases to 60 GPa at 204°C, according to the Engineering Toolbox (http://www.engineeringtoolbox.com/young-modulus-d_773.html). The different alloys differ in the composition (i.e., the overall composition). As a consequence, they differ in the phases as well as the proportions and compositions of the phases. In relation to the overall composition, the typical alloying elements are copper, magnesium, manganese, silicon, tin and zinc. For example, the aluminum alloy 6063 contains magnesium as the main alloying element; the aluminum alloy 3003 contains manganese as the main alloying element; both aluminum alloys 1060 and 1100 contain iron and silicon as the main alloying elements, though alloy 1100 contains higher concentrations of iron and silicon than alloy 1060. Thus, in spite of the alloying, the elastic modulus remains low compared to the value of 260 GPa exhibited by the abovementioned aluminum-matrix composite with SiC particles as filler and is also low compared to the value of 200 GPa for the abovementioned aluminum-matrix composite with AlN particles as filler. This means that alloying is not an adequate method for increasing the elastic modulus. Furthermore, the significant decrease of the elastic modulus of the alloys with increasing temperature is disadvantageous.

The CTE values of aluminum and various aluminum alloys (the alloys including those with alloy No. 2011, 2017, 2024, 3003, 5052, 5086, 6061 and 7075) are listed in Engineering Toolbox, http://www.engineeringtoolbox.com/thermal-expansion-metals-d_859.html). Aluminum bronze (with CTE=$16 \times 10^{-6}/°C$) that is also listed in Engineering Toolbox is actually a copper-based alloy with aluminum as an alloying element (with the aluminum content ranging from 5% to 11% by weight). According to the Engineering Toolbox (http://www.engineeringtoolbox.com/linear-expansion-coefficients-d_95.html), the CTE of copper is $16.1 \times 10^{-6}/°C$, whereas the CTE of aluminum is $22.2 \times 10^{-6}/°C$. Therefore, the inclusion of aluminum bronze in this comparative listing of aluminum alloys is not appropriate. Among all the aluminum-based alloys listed, the lowest CTE is exhibited by alloy No. 2011, which contains copper as the main alloy element and exhibits the CTE value of $23.0 \times 10^{-6}/°C$. Thus, in spite of the alloying, the CTE is only slightly lower than the value of $23.6 \times 10^{-6}/°C$ for aluminum and it is very high compared to the value of $12.4 \times 10^{-6}/°C$ exhibited by the abovementioned aluminum-matrix composite with SiC particles as filler and is also high compared to the value of $13 \times 10^{-6}/°C$ for the abovementioned aluminum-matrix composite with AlN particles as filler. This means that alloying is not an adequate method for decreasing the CTE.

The wide choices of the constituents (both the solid particles and the metal for the metal matrix) and the nearly independent choices of the constituents make the technology of this invention versatile, so that it can be tailored for the requirements of particular applications. Different requirements for various applications include high temperature ability, high creep resistance, high modulus, high strength, low density and low CTE. In particular, low density (lightweight) is important for aerospace and automotive structures for transportation fuel saving and can be provided by choosing constituents of low density.

An example of a metal-matrix composite that exhibits low density is one that consists of aluminum (with density 2.70 g/cm$^3$) for the metal matrix and SiC (with density 3.21 g/cm$^3$) for the particles. For a composite with 50 vol. % aluminum and 50 vol. % SiC, the density of the composite is the average of the densities of the two constituents, based on the Rule of Mixtures. Hence, the density of this composite is 3.00 g/cm$^3$.

This invention also provides a laminate consisting of layers that are essentially parallel to one another and bonded to one another, such that each layer consists of a metal-matrix composite. The metal-matrix composite consists of a metal matrix and a filler, such that the melting temperature of the filler is substantially higher than that of the metal matrix and the filler consists of particles that are dispersed in the composite.

The filler particles in each layer of the metal-matrix composite laminate are dispersed in the layer. The filler particles (of size ranging from 0.01 µm to 50 µm) exhibit a substantially lower value of the CTE than the metal, and a substantially higher value of the elastic modulus than the metal. The metal-matrix composite is obtained by solidification of a thixotropic fluid that consists of the filler particles dispersed in a liquid metal, which, upon solidification, is converted to the metal matrix of the composite. In this fluid, the filler particles are substantially discontinuous while the liquid metal is essentially continuous. The volume fraction of the particles in the composite is essentially equal to that of the particles in the fluid.

This invention further provides a method of making a metal-based structure in the absence of a mold. This method comprises (a) preparing a thixotropic fluid, (b) shaping this fluid (e.g., by mechanical deformation of the fluid), (c) depositing the shaped fluid on a solid substrate, and (d) allowing the deposited fluid to cool to a temperature that is sufficiently low for the fluid to solidify completely. Due to its thixotropic character, the fluid exhibits the ability to essentially maintain its shape and dimensions in the absence of a mold for the fluid.

The thixotropic fluid is a fluid only when the liquid metal in the fluid is in liquid form. This means that the fluid must be at a temperature above the solidification temperature (freezing temperature) of the liquid metal. This solidification temperature is preferably substantially above room temperature, so that the solid obtained by the solidification of the liquid metal is adequate mechanically and thermally for practical use at temperatures around room temperature. The temperature of the fluid must be maintained above the abovementioned solidification temperature in order for the fluid to remain as a fluid. Therefore, in the process described in Paragraph 111 above, the temperature of the fluid is preferably maintained above the solidification temperature of the liquid metal between step (a) and step (b). In case that the temperature of the fluid is allowed to drop to below the abovementioned solidification temperature after step (a), reheating must occur to restore the temperature to a temperature above the solidification temperature, so that the fluid state is restored, prior to the start of step (b). Similarly, in the process described in Paragraph 111 above, the temperature of the fluid is preferably maintained above the solidification temperature of the liquid metal between step (b) and step (c). In case that the temperature of the fluid is allowed to drop below the abovementioned solidification temperature after step (b), reheating must occur to restore the temperature to a temperature above the solidification temperature so as to restore the fluid state prior to the start of step (c).

In order for the thixotropic fluid to be a fluid, the solid particles in the fluid must not be locked in their positions. In other words, the solid particles must be able to move substantially relative to one another as the fluid flows.

A metal has a tendency to be oxidized in the presence of oxygen (which is present in air), particularly at an elevated temperature. The oxidation results in a metal oxide, which is not desirable for making a material with a well-controlled composition and a high level of purity. With respect to the metal, the metal oxide is a form of contamination. Oxygen is an example of a reactive gas. Another example of a reactive gas is chlorine, which tends to react with a metal to form a metal chloride.

Due to the possible reactivity of a metal (particularly a liquid metal) with gases in the environment, in the process described in Paragraph 111 above, the parts of the process set-up (equipment) containing the fluid are preferably purged with a non-reactive gas, such as nitrogen and argon. The purging preferably starts prior to the heating for forming the fluid, i.e., before step (a). It preferably occurs continuously throughout step (a), step (b), step (c) and step (d) of the process. Moreover, purging is preferably conducted in the chamber that contains the fluid, in addition to the vicinity of the orifice and the vicinity of the location of fluid deposition.

The fluid is a mixture consisting of solid particles (of size ranging from 0.01 µm to 50 µm) dispersed in a liquid metal, with the liquid substantially occupying the separation (ranging from 0.01 µm to 50 µm) between adjacent particles and essentially occupying a portion of the separation. The portion consists of a plurality of regions. Each region is in contact with the surface of a particle and extends over a distance ranging from 0.01 µm to 50 µm from this surface. Upon solidification, the fluid becomes a metal-matrix composite. The melting temperature of the substrate is substantially higher than that of the metal.

Step (a) of the process described in Paragraph 111 above involves the preparation of the fluid. This preparation preferably involves the infiltration of the liquid metal to fill the space among the particles. The infiltration is preferably assisted by the application of pressure on the liquid metal. The liquid metal is preferably obtained by the melting of a metal ingot. For example, the ingot is positioned above the particles and subsequently melted.

Step (b) of the process described in Paragraph 111 above involves the shaping of the fluid. This shaping preferably involves mechanical deformation of the fluid. An example of the mechanical deformation is the squeezing of the fluid through an orifice, akin to the squeezing of toothpaste out of the toothpaste tube.

Step (c) of the process described in Paragraph 111 involves the deposition of the fluid. It is akin to the deposition of toothpaste on a toothbrush. This deposition preferably occurs while the orifice moves with respect to the substrate on which deposition takes place. The movement preferably occurs at a controlled speed. Moreover, the movement preferably occurs in a direction which is at an angle to (e.g., perpendicular to) the direction of the coming out of the fluid from the orifice. The movement results in a deposited fluid in the form of a line or strip in the direction of the movement.

The dimensions of the orifice are preferably chosen to correspond to those of the deposited fluid obtained upon completion of step (c). The correspondence is enabled by the thixotropic character of the fluid. For example, the orifice is rectangular, with the longer dimension of the rectangle being essentially equal to the width of the line (strip) of deposited fluid, while the shorter dimension of the rectangle being essentially equal to the thickness of the line of deposited fluid. The length of the line is governed by the time and speed of the deposition. If the speed is constant, the length is equal to the product of the time and the speed.

The line mentioned above does not have to be a straight line. If the movement is along a straight line, the deposited line will be essentially a straight line. However, if the movement is not along a straight line, the deposited line will not be a straight line. For example, if the movement is along a curved line, the deposited line will be a curved line with essentially the same curvature.

The substrate is at a temperature below the solidification temperature of the liquid metal in the fluid. It is preferably at either room temperature or a temperature that is substantially below the solidification temperature. The higher is the temperature of the substrate, the less is the thermal stress encountered by the deposited material upon complete solidification of the fluid.

By repeating the process with the substrate being a metal-matrix composite made using the same method, a metal-matrix composite laminate with a plurality of layers is obtained. The number of layers is equal to 2 or above. The metal-matrix composite is thus deposited layer-by-layer. By selecting the extent of overlap between adjacent layers during the deposition, the printing of a 3D object is achieved.

The container of the fluid is limited in size. However, a metal-based structure that is larger in volume than the volume of fluid in a single container can be made by replenishing the content of the container and/or using multiple containers of fluid during the fabrication of the structure. Thus, metal-based structures that are large (as large as cars) can be fabricated.

A variable in the laminate structure is the number of layers. The larger is the thickness of the laminate, the higher tends to be the number of layers. Another variable in the laminate structure is the thickness of each layer. The larger is the thickness of a layer, the smaller is the number of layers needed to build up a laminate of a given thickness, and the shorter is the time needed for building up the laminate. In general, the layers in a laminate do not have to be equal in thickness. However, the fabrication of a laminate is simpler if all the layers in the laminate are essentially equal in thickness. A change in an orifice dimension is needed in case that a change in layer thickness is desired.

Due to (i) the high temperature of the layer being deposited compared to the already deposited layer directly beneath it and (ii) the thermal contraction that occurs as a deposited layer cools while the already deposited layer beneath it has already cooled (i.e., already finished in the contraction process), the low CTE of the metal-matrix composite minimizes the thermal stress in the deposited layer, thereby enhancing the interlayer bonding. Moreover, due to the high creep resistance of the metal-matrix composite, the dimensional change of the deposited material after solidification is minimized (thereby enhancing the near-net-shape character of the fabrication) and the high temperature resistance is improved (relative to that of the metal matrix material). Furthermore, due to the high elastic modulus and high strength of the metal-matrix composite and the high interlayer bond strength, the 3D printed structure exhibits high modulus and strength.

The filler enhances both the elastic modulus and strength of the metal-matrix composite. The strength is more sensitive to the porosity than the modulus. The strength decreases with increasing porosity. Therefore, for obtaining high strength in the composite, the porosity is preferably low (preferably less than 10 vol. %, even more preferably less than 5 vol. %).

This invention specifically provides a fluid, as illustrated in FIG. 4. This fluid exhibits the ability to essentially maintain its shape even in the absence of a mold for the fluid. The fluid consists of a mixture, which consists of solid A and a liquid. The liquid is essentially continuous in the fluid. The solid A is substantially discontinuous in the fluid. The liquid consists of a liquid metal. The liquid exhibits the ability to solidify upon cooling and the ability to be converted to solid B upon solidification. The solid A consists of particles (of size ranging from 0.01 µm to 50 µm), which exhibit the ability to move substantially relative to one another, exhibit a substantially lower value of the CTE than the solid B, and exhibit a substantially higher value of the elastic modulus than the solid B. The particles are dispersed in the fluid. The liquid substantially occupies the separation among adjacent particles. The distance of the separation ranges from 0.01 µm to 50 µm. The liquid essentially occupies a portion of the separation. This portion consists of a plurality of regions. Each region is in contact with the surface of a particle and extends over a distance ranging from 0.01 µm to 50 µm from this surface. The solid B exhibits essentially the same composition as the liquid. The particles after the cooling exhibit essentially the same composition as these particle before the cooling. The particles after the cooling exhibit essentially the same size as these particles before the cooling. The volume fraction of the particles after the cooling is essentially equal to the volume fraction of the particles in the fluid before the cooling. The fluid exhibits the ability to be converted to a metal-matrix composite upon the cooling.

In a preferred embodiment, the particles are in an amount ranging from 40% to 70% of the volume of the fluid.

In another preferred embodiment, the distance of the separation preferably ranges from 0.01 µm to 10 µm.

In yet another preferred embodiment, the size of the particles preferably ranges from 0.01 µm to 10 µm.

In still another preferred embodiment, the metal is selected from the group consisting of aluminum, magnesium, copper, nickel, cobalt, titanium, iron, steel, zinc, tin, lead, indium, cadmium, thallium, silver, gold, manganese, calcium, strontium, barium, yttrium, lanthanum, zirconium, vanadium, chromium, cerium, praseodymium, neodymium, samarium, europium, ytterbium, uranium, lithium, antimony, bismuth, and alloys thereof.

In still another preferred embodiment, the particles have composition selected from the group consisting of silicon carbide, aluminum oxide, aluminum nitride, silicon dioxide, quartz, silicon nitride, silicon oxycarbide, silicon oxynitride, aluminum oxynitride, titanium diboride, boron carbide, zirconium oxide, manganese dioxide, iron oxide, nickel oxide, ferrite, nickel ferrite, carbon, graphite, fullerene, diamond, carbide, oxide, nitride, oxycarbide, oxynitride, diboride, boride, titanate, zirconate, zirconotitanate, silicate, borosilicate, silicide, nitrite, ceramic, inorganic compound, metal-coated ceramic, metal-coated carbon, metal-coated graphite, carbon-coated ceramic, graphite-coated ceramic, molybdenum, tantalum, tungsten, nickel, and combinations thereof.

Figure 5:
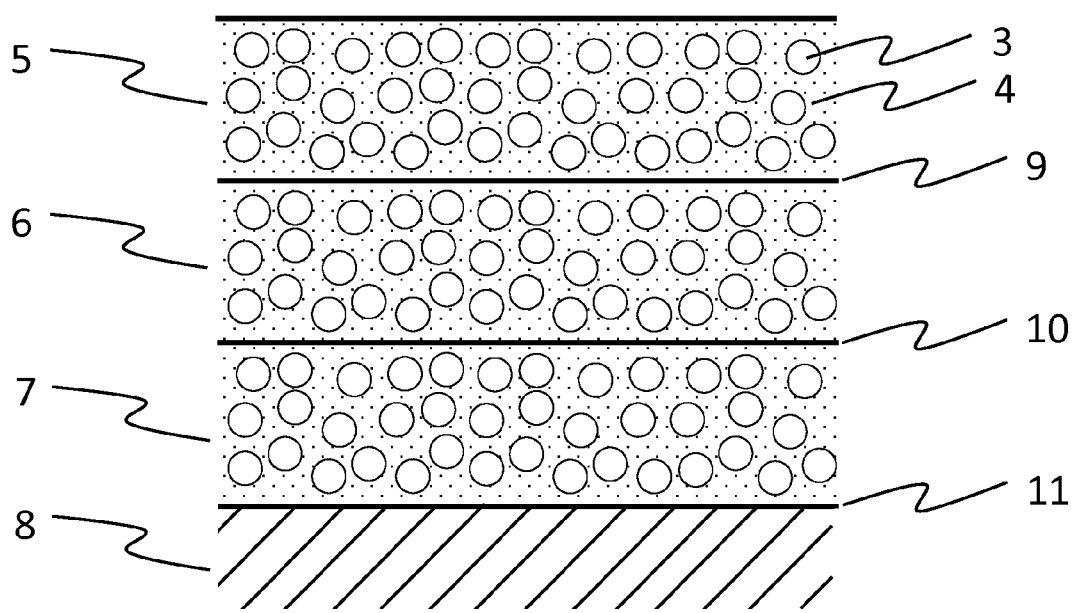
FIG. 5 shows an illustration of a metal-based laminate according to this invention. In this drawing, 3 refers to the solid particles, 4 refers to the metal matrix, 5 refers to the top metal-matrix composite layer, 6 refers to the metal-matrix composite layer below 5, 7 refers to the metal-matrix composite layer below 6, 8 refers to the substrate, which is below 7, 9 refers to the interface between 5 and 6, 10 refers to the interface between 6 and 7, and 11 refers to the interface between 7 and 8.

This invention also provides a laminate. It is illustrated in FIG. 5 for a laminate involving three layers on top of the substrate. The laminate of this invention consists of a plurality of layers. The layers are essentially parallel to one another, and are essentially bonded to one another. Each of the layers consists of a metal-matrix composite, which consists of a metal matrix and a filler. The melting temperature of the filler is substantially higher than the melting temperature of the metal matrix. The filler consists of particles (of size ranging from 0.01 μm to 50 μm), which are dispersed in the metal-matrix composite. The particles exhibit a substantially lower value of the CTE than the metal, and exhibit a substantially higher value of the elastic modulus than the metal. The metal-matrix composite is derived from a fluid. The fluid exhibits the ability to essentially maintain its shape even in the absence of a mold for the fluid. The fluid consists of a mixture, which consists of the particles and a liquid. The liquid is essentially continuous in the fluid. The particles are substantially discontinuous in the fluid. The liquid consists of a liquid metal. The liquid exhibits the ability to solidify upon cooling. The liquid exhibits the ability to be converted to the metal matrix upon solidification. The particles are dispersed in the fluid and exhibit the ability to move substantially relative to one another. The liquid substantially occupies the separation among adjacent particles. The distance of the separation ranges from 0.01 μm to 50 μm. The liquid essentially occupies a portion of the separation. The portion consists of a plurality of regions. Each region is in contact with the surface of a particle and extends over a distance ranging from 0.01 μm to 50 μm from the surface. The volume fraction of the particles after the cooling is essentially equal to the volume fraction of the particles before the cooling. The fluid exhibits the ability to be converted to the metal-matrix composite upon the cooling.

In a preferred embodiment concerning the laminate, the particles are in an amount ranging from 40% to 70% of the volume of the composite.

In another preferred embodiment concerning the laminate, the distance of the separation preferably ranges from 0.01 μm to 10 μm.

In yet another preferred embodiment concerning the laminate, the size of the particles preferably ranges from 0.01 μm to 10 μm.

In still another preferred embodiment concerning the laminate, the metal is selected from the group consisting of aluminum, magnesium, copper, nickel, cobalt, titanium, iron, steel, zinc, tin, lead, indium, cadmium, thallium, silver, gold, manganese, calcium, strontium, barium, yttrium, lanthanum, zirconium, vanadium, chromium, cerium, praseodymium, neodymium, samarium, europium, ytterbium, uranium, lithium, antimony, bismuth, and alloys thereof.

In still another preferred embodiment concerning the laminate, the particles have composition selected from the group consisting of silicon carbide, aluminum oxide, aluminum nitride, silicon dioxide, quartz, silicon nitride, silicon oxycarbide, silicon oxynitride, aluminum oxynitride, titanium diboride, boron carbide, zirconium oxide, manganese dioxide, iron oxide, nickel oxide, ferrite, nickel ferrite, carbon, graphite, fullerene, diamond, carbide, oxide, nitride, oxycarbide, oxynitride, diboride, boride, titanate, zirconate, zirconotitanate, silicate, borosilicate, silicide, nitrite, ceramic, inorganic compound, metal-coated ceramic, metal-coated carbon, metal-coated graphite, carbon-coated ceramic, graphite-coated ceramic, molybdenum, tantalum, tungsten, nickel, and combinations thereof.

This invention further provides a method of making a metal-based structure in the absence of a mold. This method comprises (a) preparing a fluid, (b) shaping the fluid, (c) depositing the fluid on a solid substrate, and (d) allowing the fluid to cool to a temperature that is sufficiently low for the fluid to solidify completely. The fluid exhibits the ability to essentially maintain its shape in the absence of a mold. The fluid consists of a mixture, which consists of solid A and a liquid. The liquid is essentially continuous in the fluid. Solid A is substantially discontinuous in the fluid. The liquid consists of a liquid metal. The liquid exhibits the ability to solidify upon cooling and is converted to solid B upon solidification. Solid A consists of particles (of size ranging from 0.01 μm to 50 μm), which exhibit a substantially lower value of the CTE than solid B, and exhibit a substantially higher value of the elastic modulus than solid B. The particles are dispersed in the fluid and exhibit the ability to move substantially relative to one another. The liquid substantially occupies the separation among adjacent particles. The distance of the separation ranges from 0.01 μm to 50 μm. The liquid essentially occupies a portion of the separation. This portion consists of a plurality of regions. Each region is in contact with the surface of a particle and extends over a distance ranging from 0.01 μm to 50 μm from this surface. The solid derived from the liquid by the cooling exhibits essentially the same composition as the liquid. The particles after the cooling exhibits essentially the same composition as the particles before the cooling. The volume fraction of the particles after the cooling being essentially equal to the volume fraction of the particles before the cooling. The fluid exhibits the ability to be converted to a metal-matrix composite upon the cooling. The metal-matrix composite exhibits essentially the same shape as the shaped fluid obtained upon completion of step (b). The melting temperature of the substrate is substantially higher than the melting temperature of solid B.

In another preferred embodiment concerning the method, the distance of the separation preferably ranges from 0.01 μm to 10 μm.

In yet another preferred embodiment concerning the method, the size of the particles preferably ranges from 0.01 μm to 10 μm.

In still another preferred embodiment concerning the method, the metal is selected from the group consisting of aluminum, magnesium, copper, nickel, cobalt, titanium, iron, steel, zinc, tin, lead, indium, cadmium, thallium, silver, gold, manganese, calcium, strontium, barium, yttrium, lanthanum, zirconium, vanadium, chromium, cerium, praseodymium, neodymium, samarium, europium, ytterbium, uranium, lithium, antimony, bismuth, and alloys thereof.

In still another preferred embodiment concerning the method, the particles have composition selected from the group consisting of silicon carbide, aluminum oxide, aluminum nitride, silicon dioxide, quartz, silicon nitride, silicon oxycarbide, silicon oxynitride, aluminum oxynitride, titanium diboride, boron carbide, zirconium oxide, manganese dioxide, iron oxide, nickel oxide, ferrite, nickel ferrite, carbon, graphite, fullerene, diamond, carbide, oxide, nitride, oxycarbide, oxynitride, diboride, boride, titanate, zirconate, zirconotitanate, silicate, borosilicate, silicide, nitrite, ceramic, inorganic compound, metal-coated ceramic, metal-coated carbon, metal-coated graphite, carbon-coated ceramic, graphite-coated ceramic, molybdenum, tantalum, tungsten, nickel, and combinations thereof.

In still another preferred embodiment concerning the method, the shaping is conducted using a process that comprises mechanical deformation.

In still another preferred embodiment concerning the method, the substrate is referred to as substrate A and is made using a method comprising (a) preparing a fluid, (b) shaping the fluid, (c) depositing the fluid on a solid substrate B, and (d) allowing the fluid to cool to a temperature that is sufficiently low for the fluid to solidify completely. The fluid exhibits the ability to essentially maintain its shape in the absence of a mold for the fluid. The fluid consists of a mixture. The mixture consists of solid C and a liquid. The liquid is essentially continuous in the fluid. Solid C is substantially discontinuous in the fluid. The liquid consists of a liquid metal. The liquid exhibits the ability to solidify upon cooling and is converted to solid D upon solidification. Solid C consists of particles of size ranging from 0.01 µm to 50 µm. The particles exhibit a substantially lower value of the CTE than solid D. The particles exhibit a substantially higher value of the elastic modulus than solid D. The particles are dispersed in the fluid and exhibit the ability to move substantially relative to one another. The liquid substantially occupies the separation between adjacent particles. The distance of the separation ranges from 0.01 µm to 50 µm. The liquid essentially occupies a portion of the separation. The portion consists of a plurality of regions. Each region is in contact with the surface of a particle and extends over a distance ranging from 0.01 µm to 50 µm from this surface. The solid derived from the liquid by the cooling exhibits essentially the same composition as the liquid. The particles after the cooling exhibit essentially the same composition as the particles before the cooling. The volume fraction of the particles after the cooling is essentially equal to the volume fraction of the particles before the cooling. The fluid exhibits the ability to be converted to a metal-matrix composite upon the cooling. The metal-matrix composite exhibits essentially the same shape as the shaped fluid obtained upon completion of step (b). The melting temperature of the substrate B is substantially higher than the melting temperature of solid D.

EXAMPLES

Example 1

A thixotropic fluid according to this invention consists of a mixture, said mixture consisting of a solid and a liquid, said liquid being essentially continuous and said solid being substantially discontinuous. This liquid is a liquid metal and this solid consists of particles. The particles exhibit a substantially lower value of the CTE than the solid derived from the liquid by solidification, and exhibit a substantially higher value of the elastic modulus than the solid derived from the liquid by solidification. The particles are dispersed in the fluid.

The liquid substantially occupies the separation between adjacent particles, such that less than 15% of the volume of the separation is occupied by pores. The distance of the separation ranges from 0.01 µm to 50 µm. The liquid essentially occupies a portion of the separation. The portion consists of a plurality of regions. Each region is in contact with the surface of a particle and extends over a distance ranging from 0.01 µm to 50 µm from this surface. Less than 5% of the volume of each region is occupied by pores.

The liquid exhibits the ability to solidify upon cooling. The solid derived from the liquid by the cooling exhibits essentially the same composition as the liquid. The particles after the cooling exhibit essentially the same composition as these particles before the cooling. The particles after the cooling exhibit essentially the same size as these particle before the cooling. The volume fraction of the particles after the cooling is essentially equal to the volume fraction of the particles in the fluid before the cooling. The fluid exhibits the ability to be converted to a metal-matrix composite upon the cooling.

Example 2

A thixotropic fluid according to this invention, consisting of 50 vol. % silicon carbide (SiC) particles and 50 vol. % liquid aluminum, is prepared using the following procedure: (i) placing a pre-determined amount of SiC particles (particle size ranging from 1 µm to 10 µm, with a mean of 3 µm) in the lower part of a cylindrical vessel, and placing a predetermined amount of ingot aluminum (essentially pure aluminum, melting temperature=660℃) in the upper part of the vessel, such that the volume of the aluminum is slightly greater than the true volume of the SiC particles (the true volume being the volume that excludes the volume of the air among the particles), (ii) closing and sealing the vessel, (iii) place the vessel in the center of a cylindrical heating element that has its exterior being thermally insulated, (iv) evacuating the vessel using a mechanical vacuum pump, (v) purging the vessel with nitrogen gas in order to remove the air in the vessel, (vi) heating the vessel to a temperature of 780℃, so that the aluminum is molten and the SiC particles are at essentially the same temperature as the liquid aluminum, (vii) applying a gradually increasing pressure (from 0 MPa to 41 MPa) that is directed at the top of the liquid aluminum for the purpose of pushing down the liquid aluminum, (viii) maintaining the pressure of 41 MPa for 40 minutes in order to infiltrate the liquid aluminum into the space among the SiC particles, such that the interparticle space is completely occupied by the liquid aluminum, and (xi) decreasing the pressure gradually from 41 MPa to 0 MPa.

Example 3

A procedure for preparing a thixotropic fluid according to this invention is the same as that in Example 2, except that aluminum nitride (AlN) particles are used in place of SiC particles. The AlN particles are of size ranging from 2 µm to 7 µm, with a mean size of 3.7 µm.

Example 4

A procedure for preparing a thixotropic fluid according to this invention is the same as that in Example 2, except that the pressure is 24 MPa instead of 41 MPa.

Example 5

A laminate according to this mention consists of a plurality of layers. The layers are essentially parallel to one another. The layers are essentially bonded to one another. Each of the layers consists of a metal-matrix composite, which consists of a metal matrix and a filler. The melting temperature of the filler is substantially higher than the melting temperature of the metal matrix. The filler consists of particles, which are dispersed in the composite, exhibit a substantially lower value of the CTE than the metal, and exhibit a substantially higher value of the elastic modulus than the metal.

The metal-matrix composite is derived from a fluid, which exhibits the ability to essentially maintain its shape in the absence of a mold for the fluid. The fluid consists of a mixture, which consists of the particles and a liquid. The liquid is essentially continuous in the fluid. The particles are substantially discontinuous in the fluid. The liquid consists of a liquid metal and exhibits the ability to solidify upon cooling. The liquid exhibits the ability to be converted to the metal matrix upon solidification. The particles are dispersed in the fluid. The liquid substantially occupies the separation among adjacent particles. Less than 15% of the volume of the separation is occupied by pores. The distance of the separation ranges from 0.01 μm to 50 μm. The liquid essentially occupies a portion of the separation. The portion consists of a plurality of regions. Each region is in contact with the surface of a particle and extends over a distance ranging from 0.01 μm to 50 μm from this surface. Less than 5% of the volume of each region is occupied by pores. The volume fraction of the particles after the cooling is essentially equal to the volume fraction of the particles in the fluid before the cooling. The fluid exhibits the ability to be converted to the metal-matrix composite upon the cooling.

Example 6

A laminate is the same as that in Example 5, except that the metal is aluminum and the filler is silicon carbide particles.

Example 7

A method of making a metal-based structure in the absence of a mold comprises (a) preparing a fluid, (b) shaping the fluid, (c) depositing the fluid on a solid substrate, and (d) allowing the fluid to cool to a temperature that is sufficiently low for the fluid to solidify completely. The fluid exhibits the ability to essentially maintain its shape in the absence of a mold.

The fluid consists of a mixture, which consists of solid A and a liquid. The liquid is essentially continuous in the fluid. Solid A is substantially discontinuous in the fluid. The liquid consists of a liquid metal. The liquid exhibits the ability to solidify upon cooling and is converted to solid B upon solidification.

Solid A consists of particles, which exhibit a substantially lower value of the CTE than solid B, and exhibit a substantially higher value of the elastic modulus than solid B. The particles are dispersed in the fluid. The liquid substantially occupies the separation among adjacent particles, such that less than 15% of the volume of the separation is occupied by pores. The distance of the separation ranges from 0.01 μm to 50 μm. The liquid essentially occupies a portion of the separation. The portion consists of a plurality of regions. Each region is in contact with the surface of a particle and extends over a distance ranging from 0.01 μm to 50 μm from this surface. Less than 5% of the volume of each region is occupied by pores.

The particles after the cooling exhibit essentially the same composition as the particles before the cooling. The volume fraction of the particles after the cooling is essentially equal to the volume fraction of the particles before the cooling. The fluid exhibits the ability to be converted to a metal-matrix composite upon the cooling. The metal-matrix composite exhibits essentially the same shape as the shaped fluid obtained upon completion of step (b). The melting temperature of the substrate is substantially higher than the melting temperature of the metal.

Example 8

A method of making a metal-based structure in the absence of a mold is the same as that in Example 7 except that the shaping is conducted using a process that comprises mechanical deformation. The deformation involves squeezing.

Example 9

A method of making a metal-based structure in the absence of a mold is the same as that in Example 7 except that the substrate is referred to as substrate A and substrate A is made using a method comprising (a) preparing a fluid, (b) shaping the fluid, (c) depositing the fluid on a solid substrate B, and (d) allowing the fluid to cool to a temperature that is sufficiently low for the fluid to solidify completely. The fluid exhibits the ability to essentially maintain its shape in the absence of a mold for the fluid.

The fluid consists of a mixture, which consists of solid C and a liquid. The liquid is essentially continuous in the fluid. Solid C is substantially discontinuous in the fluid. The liquid consists of a liquid metal. The liquid exhibits the ability to solidify upon cooling and is converted to solid D upon solidification.

Solid C consists of particles. The particles exhibit a substantially lower value of the CTE than solid D. The particles exhibit a substantially higher value of the elastic modulus than solid D. The particles are dispersed in the fluid. The liquid substantially occupies the separation among adjacent particles, such that less than 15% of the volume of the separation is occupied by pores. The distance of the separation ranges from 0.01 μm to 50 μm. The liquid essentially occupies a portion of the separation. The portion consists of a plurality of regions. Each region is in contact with the surface of a particle and extends over a distance ranging from 0.01 μm to 50 μm from this surface. Less than 5% of the volume of each region is occupied by pores.

The particles after the cooling exhibit essentially the same composition as the particles before the cooling. The volume fraction of the particles after the cooling is essentially equal to the volume fraction of the particles before the cooling. The fluid exhibits the ability to be converted to a metal-matrix composite upon the cooling. The metal-matrix composite exhibits essentially the same shape as the shaped fluid obtained upon completion of step (b). The melting temperature of the substrate B being substantially higher than the melting temperature of solid D.

Example 10

A metal laminate according to this invention, with the metal-matrix composite consisting of 50 vol. % silicon carbide (SiC) particles and 50 vol. % aluminum matrix, is prepared using the following: (i) placing a pre-determined amount of silicon carbide (SiC) particles (particle size ranging from 1 μm to 10 μm, with a mean of 3 μm) in the lower part of a cylindrical vessel, and placing a predetermined amount of ingot aluminum (essentially pure aluminum, melting temperature=660℃) in the upper part of the vessel, such that the volume of the aluminum is slightly greater than the volume of the SiC particles (excluding the volume of the air among the particles), (ii) closing and sealing the vessel, (iii) place the vessel at the center of a cylindrical heating element that has its exterior thermally insulated, (iv) evacuating the vessel using a mechanical vacuum pump, (v) purging the vessel with nitrogen gas in order to remove the air in the vessel, (vi) heating the vessel to a temperature of 780℃, so that the aluminum is molten and the SiC particles are at essentially the same temperature as the liquid aluminum, (vii) applying a gradually increasing pressure (from 0 MPa to 41 MPa) that is directed at the top of the liquid aluminum for the purpose of pushing down the liquid aluminum, (viii) maintaining the pressure of 41 MPa for 40 minutes in order to infiltrate the liquid aluminum into the space among the SiC particles, such that the interparticle space is essentially occupied by the liquid aluminum, (ix) decreasing the pressure gradually from 41 MPa to 24 MPa and maintain the pressure at 24 MPa, (x) directing nitrogen gas at and in the vicinity of the orifice of size 12 mm×4 mm located at the center of the bottom of the vessel, including the region where the fluid is to be deposited, (xi) opening the orifice and allowing the fluid to come out of the nozzle and be deposited on a substrate while the platform holding the substrate is translated in a horizontal direction at a controlled speed, thereby resulting in a strip (first layer) of thickness 4 mm, width 12 mm and a length that is proportional to the deposition time, and (xii) changing the direction of the translation by 180° and continuing the deposition in a horizontal direction so as to form a second layer on top of a part or all of the first layer.

Example 11

A procedure for preparing a metal laminate according to this invention is the same as that in Example 10, except that the pressure is 24 MPa instead of 41 MPa.

Although preferred embodiments have been depicted and described in detail herein, it will be apparent to those skilled in the relevant art that various additions, substitutions, modifications and the like can be made without departing from the spirit of the invention and these are therefore considered to be within the scope of the invention as defined in the claims which follow.

What is claimed:
1. A fluid,
said fluid exhibits the ability to essentially maintain its shape in the absence of a mold for said fluid,
said fluid consists of a mixture,
said mixture consists of solid A and a liquid,
said liquid is essentially continuous in said fluid,
said solid A is substantially discontinuous in said fluid,
said liquid consists of a liquid metal,
said liquid exhibits the ability to solidify upon cooling,
said liquid exhibits the ability to be converted to solid B upon solidification,
said solid A consists of particles,
said particles exhibit the ability to move substantially relative to one another,
said particles exhibit a substantially lower value of coefficient of thermal expansion than solid B,
said particles exhibit a substantially higher value of elastic modulus than solid B,
said particles exhibit a size,
said size ranges from 0.01 µm to 50 µm,
said particles are dispersed in said fluid,
said particles are substantially separate,
the distance of separation ranges from 0.01 µm to 50 µm,
said liquid substantially occupies said separation,
said liquid essentially occupies a portion of said separation,
said portion consists of a plurality of regions,
each of said particles exhibits a surface,
each of said regions is in contact with said surface,
each of said regions extends over a distance from said surface,
said distance from said surface ranges from 0.01 µm to 50 µm,
said particles after said cooling exhibits essentially the same composition as said particles before said cooling,
said particles after said cooling exhibits essentially the same size as said particles before said cooling,
the volume fraction of said particles after said cooling is essentially equal to the volume fraction of said particles before said cooling, and
said fluid exhibits the ability to be converted to a metal-matrix composite upon said cooling.

2. The fluid of claim 1, wherein said particles are in an amount ranging from 40% to 70% of a volume of said fluid.

3. The fluid of claim 1, wherein said distance of separation ranges from 0.01 µm to 10 µm.

4. The fluid of claim 1, wherein said size ranges from 0.01 µm to 10 µm.

5. The fluid of claim 1, wherein said metal is selected from the group consisting of aluminum, magnesium, copper, nickel, cobalt, titanium, iron, steel, zinc, tin, lead, indium, cadmium, thallium, silver, gold, manganese, calcium, strontium, barium, yttrium, lanthanum, zirconium, vanadium, chromium, cerium, praseodymium, neodymium, samarium, europium, ytterbium, uranium, lithium, antimony, bismuth, and alloys thereof.

6. The fluid of claim 1, wherein said particles have composition selected from the group consisting of silicon carbide, aluminum oxide, aluminum nitride, silicon dioxide, quartz, silicon nitride, silicon oxycarbide, silicon oxynitride, aluminum oxynitride, titanium diboride, boron carbide, zirconium oxide, manganese dioxide, iron oxide, nickel oxide, ferrite, nickel ferrite, carbon, graphite, fullerene, diamond, carbide, oxide, nitride, oxycarbide, oxynitride, diboride, boride, titanate, zirconate, zirconotitanate, silicate, borosilicate, silicide, nitrite, ceramic, metal-coated ceramic, metal-coated carbon, metal-coated graphite, carbon-coated ceramic, graphite-coated ceramic, molybdenum, tantalum, tungsten, nickel, and combinations thereof.

7. A laminate,
said laminate consisting of a plurality of layers,
said layers are essentially parallel to one another,
said layers are essentially bonded to one another,
each of said layers consists of a metal-matrix composite,
said metal-matrix composite consists of a metal matrix and a filler,
the melting temperature of said filler is substantially higher than the melting temperature of said metal matrix,
said filler consists of particles,
said particles exhibit a size,
said size ranges from 0.01 µm to 50 µm,
said particles are dispersed in said composite,
said particles exhibit a substantially lower value of coefficient of thermal expansion than said metal,
said particles exhibit a substantially higher value of elastic modulus than said metal,
said metal-matrix composite is derived from a fluid,
said fluid exhibits the ability to essentially maintain its shape in the absence of a mold for said fluid, said fluid consists of a mixture,
  said mixture consists of said particles and a liquid,
  said liquid is essentially continuous in said fluid,
  said particles are substantially discontinuous in said fluid,
said liquid consists of a liquid metal,
said liquid exhibits the ability to solidify upon cooling,
said liquid exhibits the ability to be converted to said metal matrix upon solidification,
said particles are dispersed in said fluid,
said particles in said fluid exhibit the ability to move substantially relative to one another,
said particles are substantially separate,
  the distance of separation ranges from 0.01 µm to 50 µm,
said liquid substantially occupies said separation,
said liquid essentially occupies a portion of said separation,
  said portion consists of a plurality of regions,
each of said particles exhibits a surface,
  each of said regions is in contact with said surface,
  each of said regions extends over a distance from said surface,
    said distance from said surface ranges from 0.01 µm to 50 µm,
the volume fraction of said particles after said cooling is essentially equal to the volume fraction of said particles before said cooling, and
said fluid exhibits the ability to be converted to said metal-matrix composite upon said cooling.

8. The laminate of claim 7, wherein said particles are in an amount ranging from 40% to 70% of the volume of said composite.

9. The laminate of claim 7, wherein said distance of separation ranges from 0.01 µm to 10 µm.

10. The laminate of claim 7, wherein said size ranges from 0.01 µm to 10 µm.

11. The laminate of claim 7, wherein said metal is selected from the group consisting of aluminum, magnesium, copper, nickel, cobalt, titanium, iron, steel, zinc, tin, lead, indium, cadmium, thallium, silver, gold, manganese, calcium, strontium, barium, yttrium, lanthanum, zirconium, vanadium, chromium, cerium, praseodymium, neodymium, samarium, europium, ytterbium, uranium, lithium, antimony, bismuth, and alloys thereof.

12. The laminate of claim 7, wherein said particles have composition selected from the group consisting of silicon carbide, aluminum oxide, aluminum nitride, silicon dioxide, quartz, silicon nitride, silicon oxycarbide, silicon oxynitride, aluminum oxynitride, titanium diboride, boron carbide, zirconium oxide, manganese dioxide, iron oxide, nickel oxide, ferrite, nickel ferrite, carbon, graphite, fullerene, diamond, carbide, oxide, nitride, oxycarbide, oxynitride, diboride, boride, titanate, zirconate, zirconotitanate, silicate, borosilicate, silicide, nitrite, ceramic, metal-coated ceramic, metal-coated carbon, metal-coated graphite, carbon-coated ceramic, graphite-coated ceramic, molybdenum, tantalum, tungsten, nickel, and combinations thereof.

* * * * *